United States Patent
Vemuri et al.

(10) Patent No.: US 11,704,535 B1
(45) Date of Patent: Jul. 18, 2023

(54) HARDWARE ARCHITECTURE FOR A NEURAL NETWORK ACCELERATOR

(71) Applicant: Xilinx, Inc., San Jose, CA (US)

(72) Inventors: Kumar S. S. Vemuri, Hyderabad (IN); Mahesh S. Mahadurkar, Wani (IN); Pavan K. Nadimpalli, Gudivada (IN); Venkat Praveen K. Kancharlapalli, Vijayawada (IN)

(73) Assignee: XILINX, INC., San Jose, CA (US)

(*) Notice: Subject to any disclaimer, the term of this patent is extended or adjusted under 35 U.S.C. 154(b) by 1,066 days.

(21) Appl. No.: 16/415,907

(22) Filed: May 17, 2019

(51) Int. Cl.
| | |
|---|---|
| *G06N 3/04* | (2023.01) |
| *G06F 3/06* | (2006.01) |
| *G06N 3/063* | (2023.01) |
| *G06F 5/16* | (2006.01) |
| *G06N 3/02* | (2006.01) |
| *G06N 3/06* | (2006.01) |
| *G06N 20/00* | (2019.01) |

(52) U.S. Cl.
CPC .............. *G06N 3/04* (2013.01); *G06F 3/0655* (2013.01); *G06F 3/0656* (2013.01); *G06N 3/063* (2013.01); *G06F 3/061* (2013.01); *G06F 3/0613* (2013.01); *G06F 3/0635* (2013.01); *G06F 3/0679* (2013.01); *G06F 3/0688* (2013.01); *G06F 5/16* (2013.01); *G06N 3/02* (2013.01); *G06N 3/06* (2013.01); *G06N 20/00* (2019.01)

(58) Field of Classification Search
CPC .... G06N 3/02; G06N 3/04; G06N 3/06; G06N 3/063; G06F 3/0655; G06F 3/0656; G06F 3/0635; G06F 3/0688; G06F 3/0679; G06F 3/061; G06F 3/0613; G06F 5/16; G06N 20/00; G06N 20/10; G06N 20/20
See application file for complete search history.

(56) References Cited

U.S. PATENT DOCUMENTS

| | | | |
|---|---|---|---|
| 2018/0039886 A1 | 2/2018 | Umuroglu et al. | |
| 2018/0203956 A1 | 7/2018 | Ng et al. | |
| 2019/0057305 A1 | 2/2019 | Denolf et al. | |
| 2019/0087708 A1* | 3/2019 | Goulding et al. | G06N 3/082 |
| 2020/0051309 A1* | 2/2020 | Labbe et al. | G06N 3/08 |

* cited by examiner

*Primary Examiner* — Shane D Woolwine
(74) *Attorney, Agent, or Firm* — Patterson + Sheridan, LLP

(57) ABSTRACT

Examples herein describe hardware architecture for processing and accelerating data passing through layers of a neural network. In one embodiment, a reconfigurable integrated circuit (IC) for use with a neural network includes a digital processing engine (DPE) array, each DPE having a plurality of neural network units (NNUs). Each DPE generates different output data based on the currently processing layer of the neural network, with the NNUs parallel processing different input data sets. The reconfigurable IC also includes a plurality of ping-pong buffers designed to alternate storing and processing data for the layers of the neural network.

21 Claims, 18 Drawing Sheets

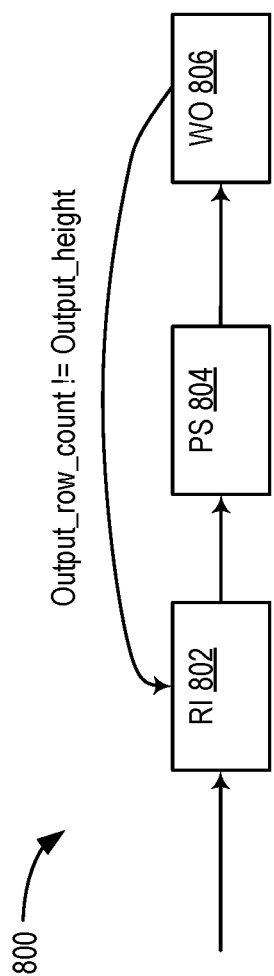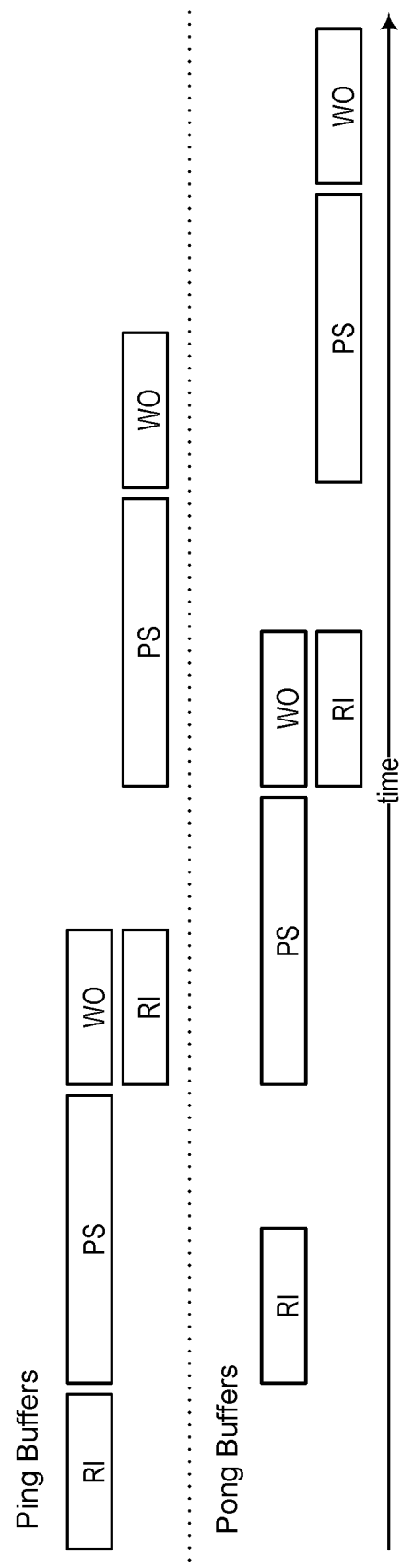

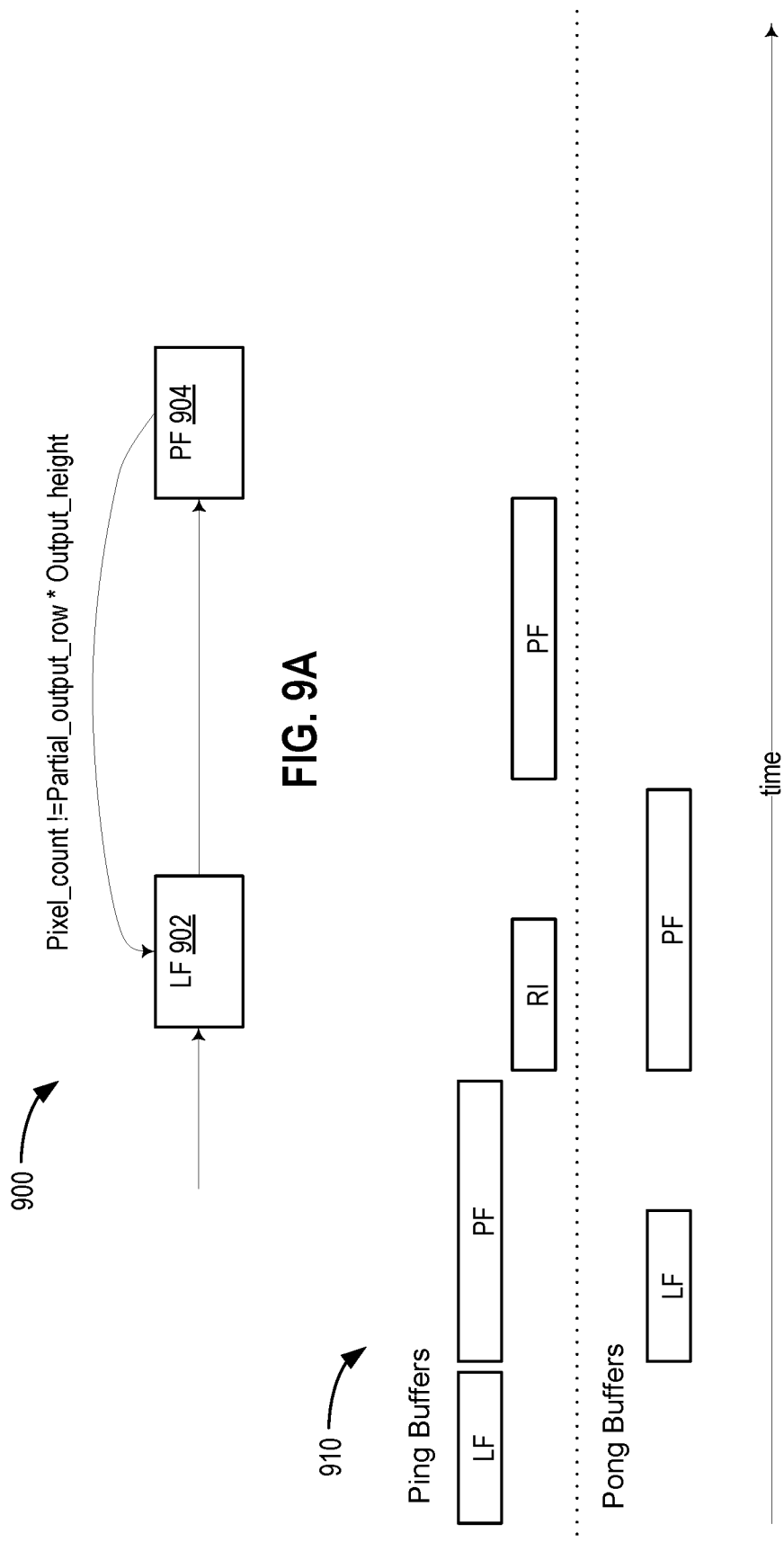

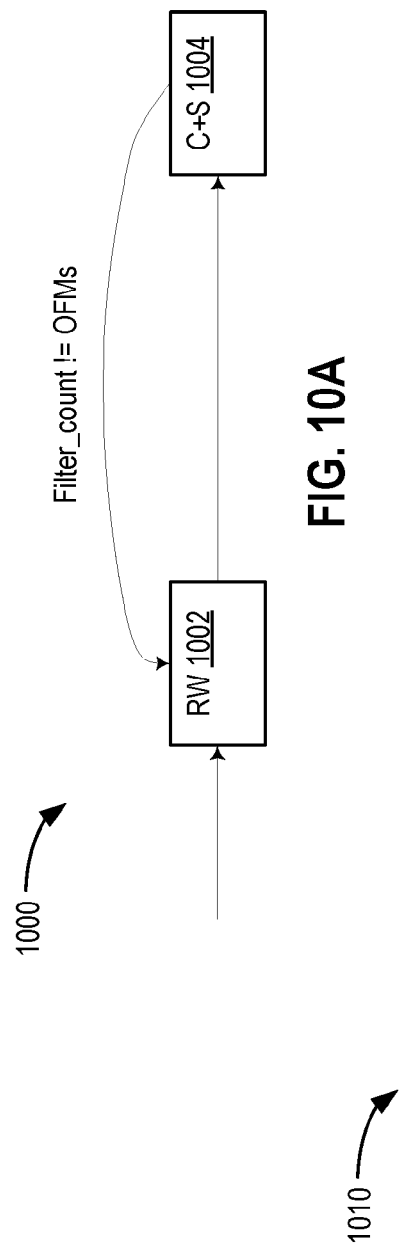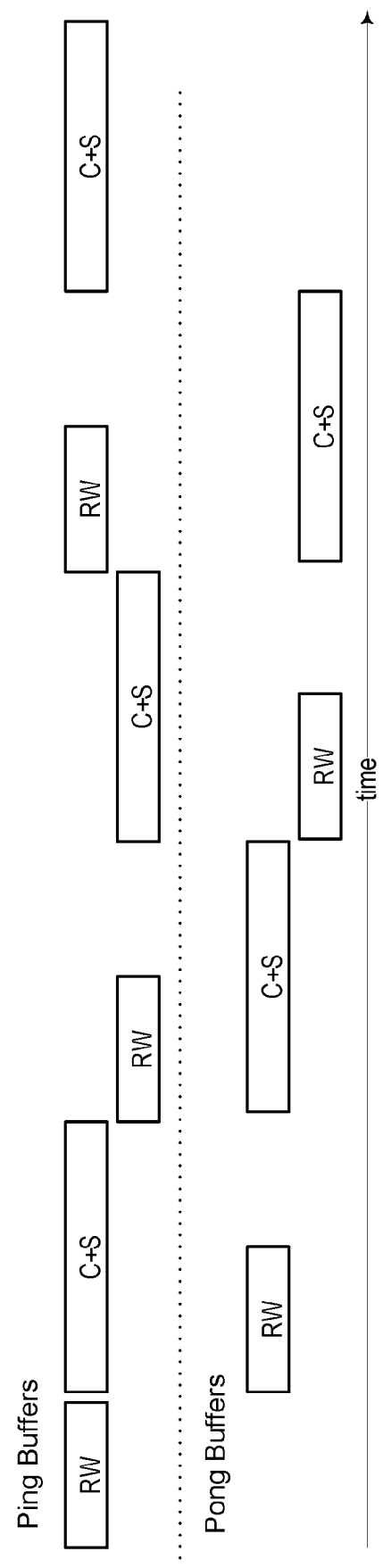
FIG. 10A
FIG. 10B

FIG. 16

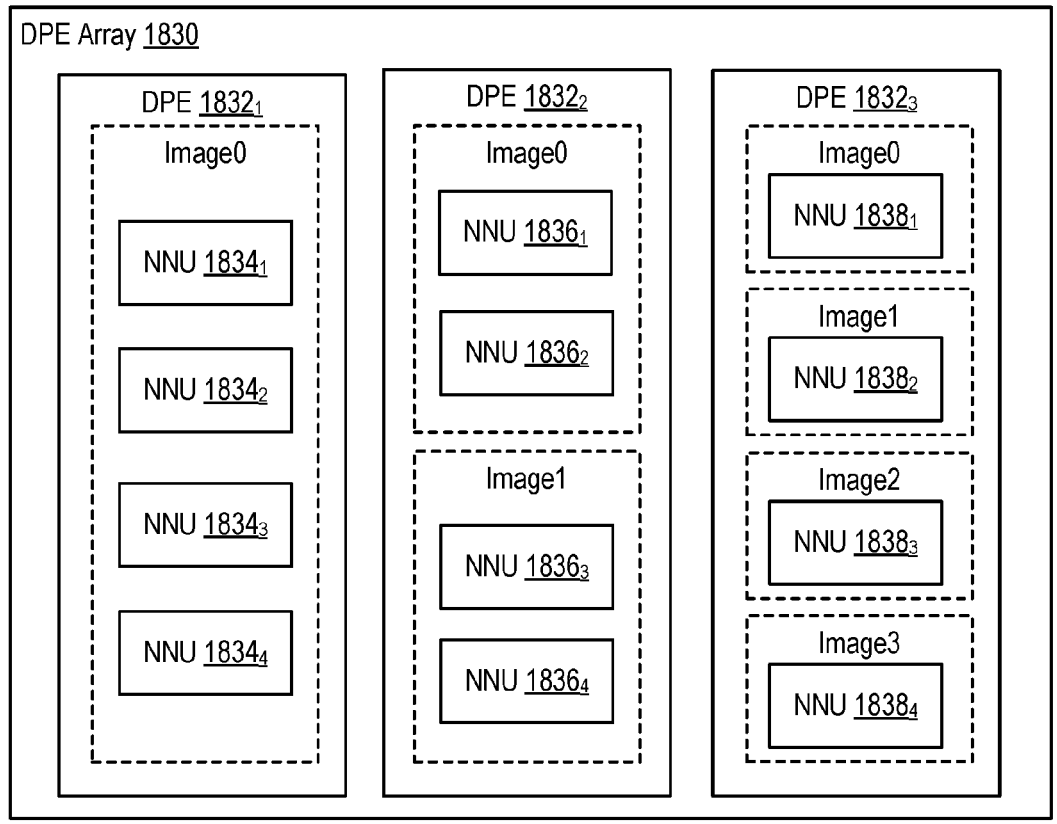
FIG. 18
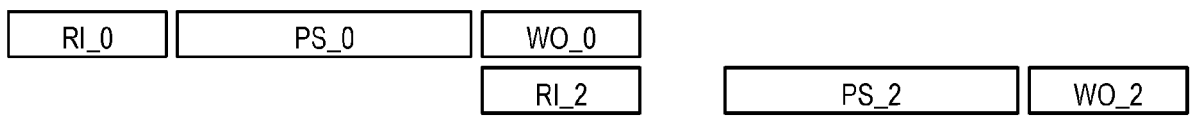
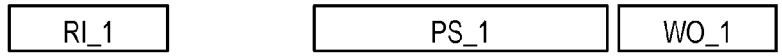
FIG. 19

HARDWARE ARCHITECTURE FOR A NEURAL NETWORK ACCELERATOR

TECHNICAL FIELD

Examples of the present disclosure generally relate to hardware architecture for neural network accelerators.

BACKGROUND

Neural networks are currently widely used for many artificial intelligence applications including computer vision, speech recognition, robotics, etc. A neural network based system design consists of two phases: training and inference. The training phase (also known as the learning phase) involves determining the values of the weights of the network layers. Once trained, the neural network can perform its task by computing the outputs using the weights generated in the training phase. The inference phase involves computing the outputs to perform a specific task. While neural network based systems can deliver state-of-the-art accuracies on many tasks, they are computationally complex. There are many different kinds of layers: convolution, max pooling, fully connected, Rectified Linear Unit (ReLU), batch norm, etc. These different layers are used in designing these deep-learning based inference models. Integrated circuits (ICs), such as Field Programmable Gate Arrays (FPGAs), can accelerate the performance of these compute-intensive layers.

Neural networks are typically constructed using a set of layers connected through buffers. One of the most compute-intensive layers of contemporary neural networks is the convolution layer. In a convolution layer, a set of kernels processes a set of input feature-maps using parameters and weights learned through the training phase of creating the neural network, and the set of kernels generate a set of output feature-maps..

Because of the intensity of the computation needed for a convolution layer of a neural network, a typical processing unit (e.g., general purpose central processing unit (CPU)) is often a poor choice for executing neural networks, especially in terms of getting the right amount of latency and memory usage.

SUMMARY

An integrated circuit (IC) for processing and accelerating data passing through a neural network is disclosed. One example is a reconfigurable IC that includes a digital processing engine (DPE) array having a plurality of DPEs configured to execute one or more layers of a neural network. The reconfigurable IC also includes programmable logic, which includes: an IO controller coupled to input ping-pong buffers the IO controller receiving input data from an interconnect coupled to the programmable logic, wherein the input data fills a first input buffer of the input ping-pong buffers while data stored in a second input buffer of the input ping-pong buffers is processed; a feeding controller coupled to feeding ping-pong buffers the feeding controller receiving input data from the IO controller via the input ping-pong buffers and transmitting the input data through the feeding ping-pong buffers to the DPE array wherein the input data fills a first feeding buffer of the feeding ping-pong buffers while data stored in a second feeding buffer of the feeding ping-pong buffers is processed by the one or more layers executing in the DPE array; a weight controller coupled to weight ping-pong buffers the weight controller receiving weight data from the interconnect and transmitting the weight data through the weight ping-pong buffers to the DPE array wherein the weight data fills a first weight buffer of the weight ping-pong buffers while data stored in a second weight buffer of the weight ping-pong buffers is processed by the one or more layers executing in the DPE array; and an output controller coupled to the plurality of output ping-pong buffers the output controller receiving output data from the one or more layers executing in the DPE array via the output ping-pong buffers, wherein the output data fills a first output buffer of the output ping-pong buffers while data stored in a second output buffer of the output ping-pong buffers is outputted to a host computing system communicatively coupled to the IC.

A method for operating a reconfigurable IC for processing and accelerating data passing through a neural network is disclosed. The method includes configuring a subset of an array of digital processing engines (DPEs) using to a host based on configuration data received by the IC, wherein each of the subset of DPEs is independently configurable; configuring a subset of an array of neural network units (NNUs) of each of the subset of the array of DPEs using the host based on the configuration data, wherein each of the subset of the array of NNUs is independently configurable; operating each of the subset of the array of DPEs on a different input data sets, wherein the operation of the DPEs is based on a layer of a neural network; and processing, using the selected NNUs of each configured DPE, a portion of the different input data sets to generate output data.

Another method for operating a reconfigurable IC for processing and accelerating data passing through a neural network is disclosed. The method includes receiving and storing first data into a ping buffer from a first data controller of the IC; concurrently processing the first data in the ping buffer while receiving and storing second data into a pong buffer from the data controller; and transmitting the first data in the ping buffer to a second data controller of the IC.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIGS. 8A-B illustrate states and the corresponding data flow of buffers of the neural network reconfigurable IC, in accordance with the embodiments disclosed.

FIGS. 9A-B illustrate states and the corresponding data flow of buffers of the neural network reconfigurable IC, in accordance with the embodiments disclosed.

FIGS. 10A-B illustrate states and the corresponding data flow of buffers of the neural network reconfigurable IC, in accordance with the embodiments disclosed

FIG. 16 illustrates the data organization in buffers, in accordance with the embodiments disclosed.

FIG. 18 depicts example arrangements of neural network units, in accordance with the embodiments disclosed.

FIG. 19 illustrates data flow of buffers of the neural network reconfigurable IC, in accordance with the embodiments disclosed.

DETAILED DESCRIPTION

Figure 1:
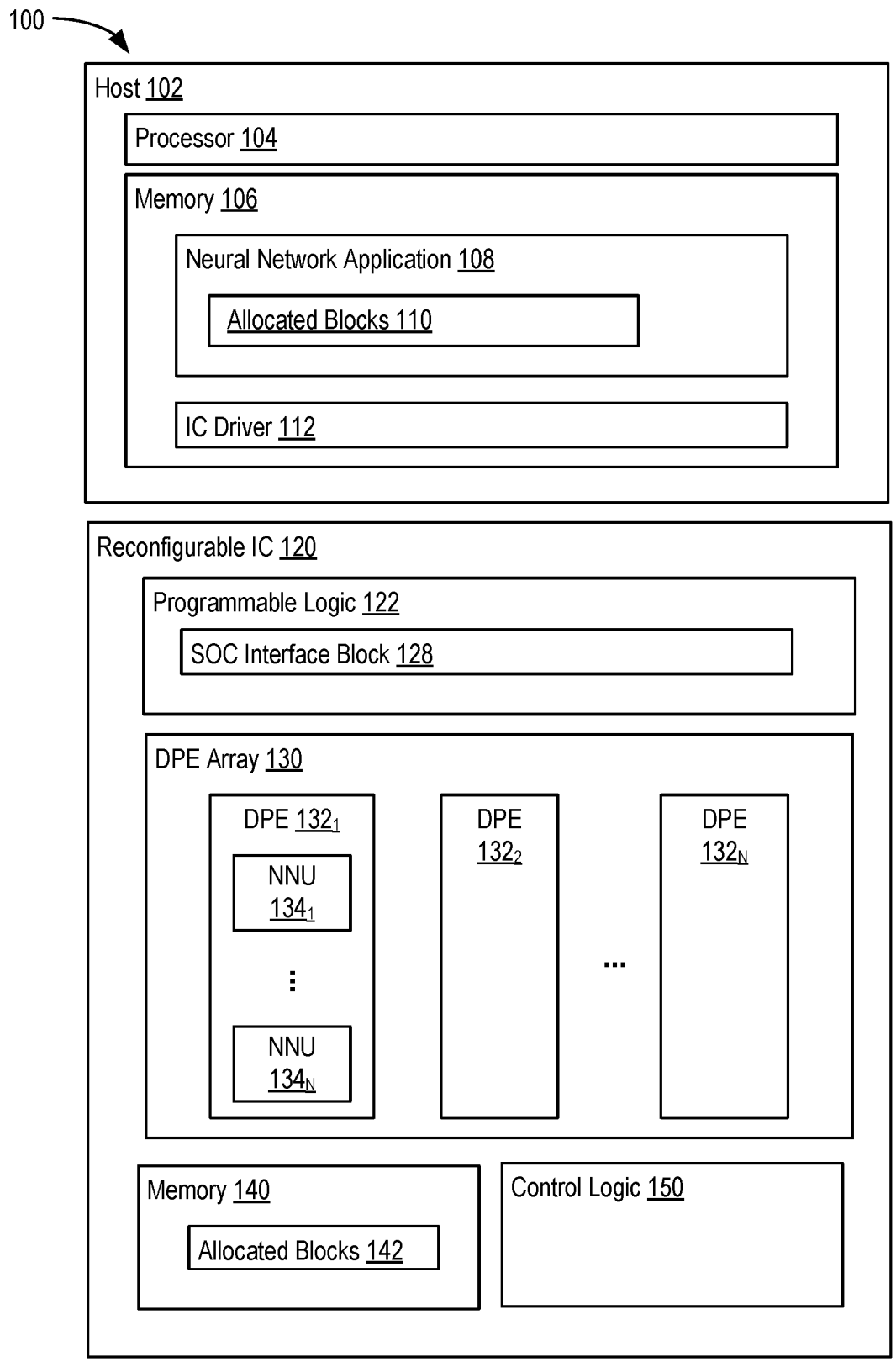
FIG. 1 is a block diagram of the hardware architecture of an integrated circuit, in accordance with the embodiment disclosed.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have the aspects or advantages shown. An aspect or an advantage described in conjunction with a particular example is not necessarily limited to that example and can be practiced in any other examples even if not so illustrated, or if not so explicitly described.

Embodiments herein describe a reconfigurable integrated circuit (IC) with hardware architecture for neural network acceleration. In one embodiment, a user can scale and configure the hardware architecture for the neural network inference accelerator core presented herein. The reconfigurable IC can process and accelerate various layers used in neural networks, including, but not limited to, convolution, max-pool, batch norm, scale, ReLU, fully-connected, and ElementWise layers. Intermediate data and buffers between layers are written and read to and from external memory (e.g., dynamic random access memory (DRAM)). To mitigate the impact of memory access latencies on the overall performance of the reconfigurable IC, the reconfigurable IC also allows for fusion of layers. As used herein, the neural network accelerator core is referred to as a "reconfigurable IC."

The reconfigurable IC described herein accelerates processing of data passing through layers of neural networks by configuring a configurable number of digital processing engines (DPEs) and corresponding neural network units (NNUs) to process the data in parallel. By processing data in parallel, the reconfigurable IC can more quickly generate output data for the layers of the neural networks. The reconfigurable IC also accelerates data processing by leveraging a ping-pong scheme for the storage structures of the reconfigurable IC. By implementing a ping-pong scheme for the storage structures, the reconfigurable IC hides memory access and data transfer latencies behind concurrent data processing.

One type of reconfigurable IC that may work for processing and accelerating data passing through the layers of neural networks are FPGAs, which have many lookup arrays, available on-chip storage, and digital signal processing units. Using these FPGA components, an exemplary logic hardware design to connect these components for the functionality of different layer types of a neural network is described herein. While the present disclosure discusses a hardware design for processing and accelerating data passing through a neural network, the present disclosure is not limited to neural networks or deep neural networks (DNN) and can include other types of machine learning frameworks.

FIG. 1 is a block diagram of the architecture of a reconfigurable integrated circuit (IC) in use with a host computer, in accordance with the embodiment disclosed. The host computer 102 (also referred herein as a host) comprises a processor 104 and memory 106. In the exemplary embodiment, the memory 106 comprises a neural network application 108 with allocated blocks 110 and an IC driver 112. The detailed circuitry within the memory 106 is described below, but can include any type of volatile or nonvolatile memory (e.g., DRAM). In one embodiment, the memory 106 includes an array of memory elements. In one embodiment, the memory 106 stores input image data, such as input feature maps, and activation outputs from various and/or previous layers of the neural network.

The reconfigurable IC 120 includes programmable logic 122 to configure a digital processing engine (DPE) array 130. For example, using a received bitstream that contains configuration data, control logic 150 can configure the programmable logic 122 (which can include a plurality of configurable logic blocks) to use any number of DPEs ($132_1$-$132_N$) that have any number of neural network units (NNUs) ($134_1$-$134_N$) in each of the DPEs. For example, the programmable logic 122 can be programmed to include look up tables, function generators, registers, multiplexers, and the like. In some embodiments, the programmable logic implements controllers of the reconfigurable IC, which are described in reference to FIG. 4.

In FIG. 1, the allocated blocks 142 of the memory 140 comprise data of the neural network, including data derived when training the neural network. As with the memory 106 of the host computer 102, the detailed circuitry within the memory 140 is described below, but can include any type of volatile or nonvolatile memory. In one embodiment, the memory 140 includes an array of memory elements.

The DPE array 130 of the reconfigurable IC 120 has any number of DPEs (also referred to as kernel processors), and these DPEs of the DPE array 130 perform operations on the input data (e.g., data points of input feature maps) to generate output data (e.g., data points of output feature maps). In one embodiment, based on the configuration data, only a subset of DPEs perform operations on the input data. In some embodiment, each DPE is an array of NNUs $134_1$-$134_N$ (also referred to as a pixel processor when the NNUs are used to process pixels in a captured image) and comprises specialized circuitry to connect the array of NNUs $134_1$-$134_N$. Although FIG. 1 illustrates the DPEs arranged in a single row, the embodiments are not limited to this arrangement.

NNUs $134_1$-$134_N$ process the incoming input data and generate output data for layers of the neural network. In some embodiments, because the DPEs processes input data for a single layer of the neural network at any given time, the NNUs $134_1$-$134_N$ of each DPE take in the input data and generate different output data points of the output data for the currently processing layers of the neural network. Further details about the DPEs and the NNUs are provided below.

In some embodiments, NNUs $134_1$-$134_N$ comprise non-programmable logic i.e., are hardened specialized processing elements. In such embodiments, the NNUs comprise hardware elements including, but not limited to, program memories, an instruction fetch/decode unit, fixed-point vector units, floating-point vector units, arithmetic logic units (ALUs), and multiply accumulators (MAC). Although the NNUs $134_1$-$134_N$ may be hardened, this does not mean the NNUs are not programmable. That is, the NNUs $134_1$-$134_N$ can be configured to perform different operations based on the configuration data. In one embodiment, the NNUs $134_1$-$134_N$ are identical. That is, each of the NNUs $134_1$-$134_N$ may have the same hardware components or circuitry. In other embodiments, the NNUs can comprise digital signal processing engines, cryptographic engines, Forward Error Correction (FEC) engines, or other specialized hardware for performing one or more specialized tasks.

Although FIG. 1 illustrates the NNUs $134_1$-$134_N$ arranged in a single column for DPE $132_1$, the embodiments are not limited to this arrangement, and so the DPEs $132_1$-$132_N$ can have any arrangement of NNUs.

Figure 2:
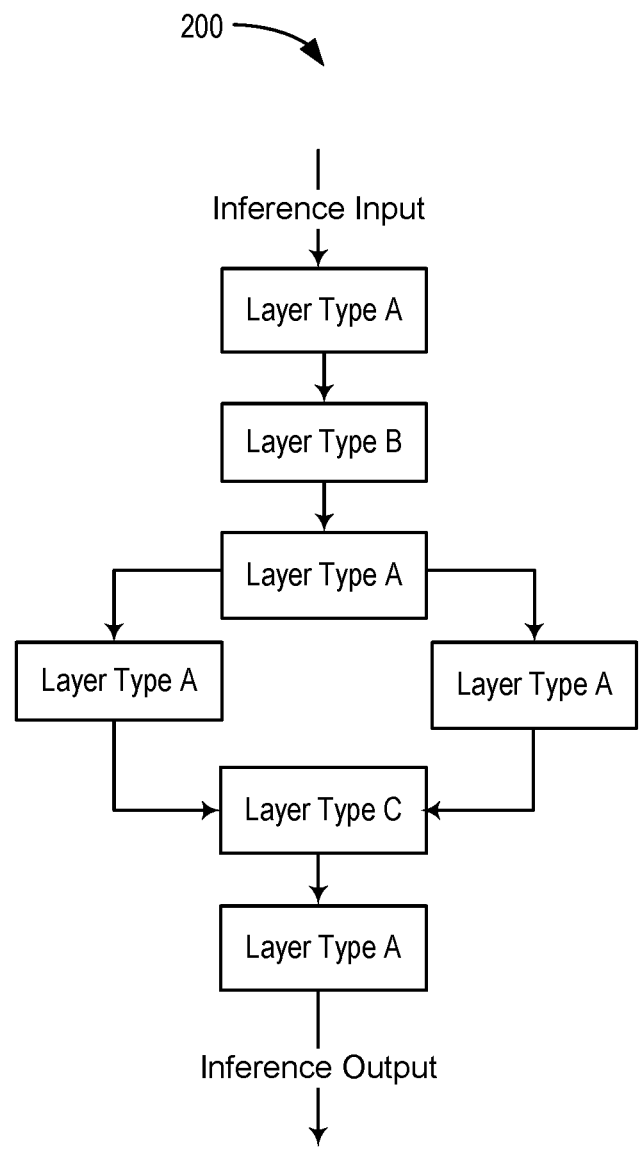
FIG. 2 is an example flowchart of layers of a neural network.

FIG. 2 is an example neural network that can be executed using the reconfigurable IC 120 in FIG. 1. For example, the DPEs $132_1$-$132_N$ and NNUs $134_1$-$134_N$ of the DPEs execute the operations corresponding to the different layers of the neural network. In FIG. 2, the exemplary neural network 200 comprises three layer types and each layer type can have multiple instances. As shown in FIG. 2, the neural network 200 takes in inference input and goes through the series of layer instances, and returns an output inference. The input interference goes through a first Layer Type A, a first Layer Type B, and then a second Layer Type A. The results of the second Layer Type A are duplicated before simultaneously going through a third Layer Type A and a fourth Layer Type A, and the results of these two separate Layer Type A are the input to the first Layer Type C. The results of Layer Type C then pass through the last Layer Type A to get the output inference.

Figure 3:
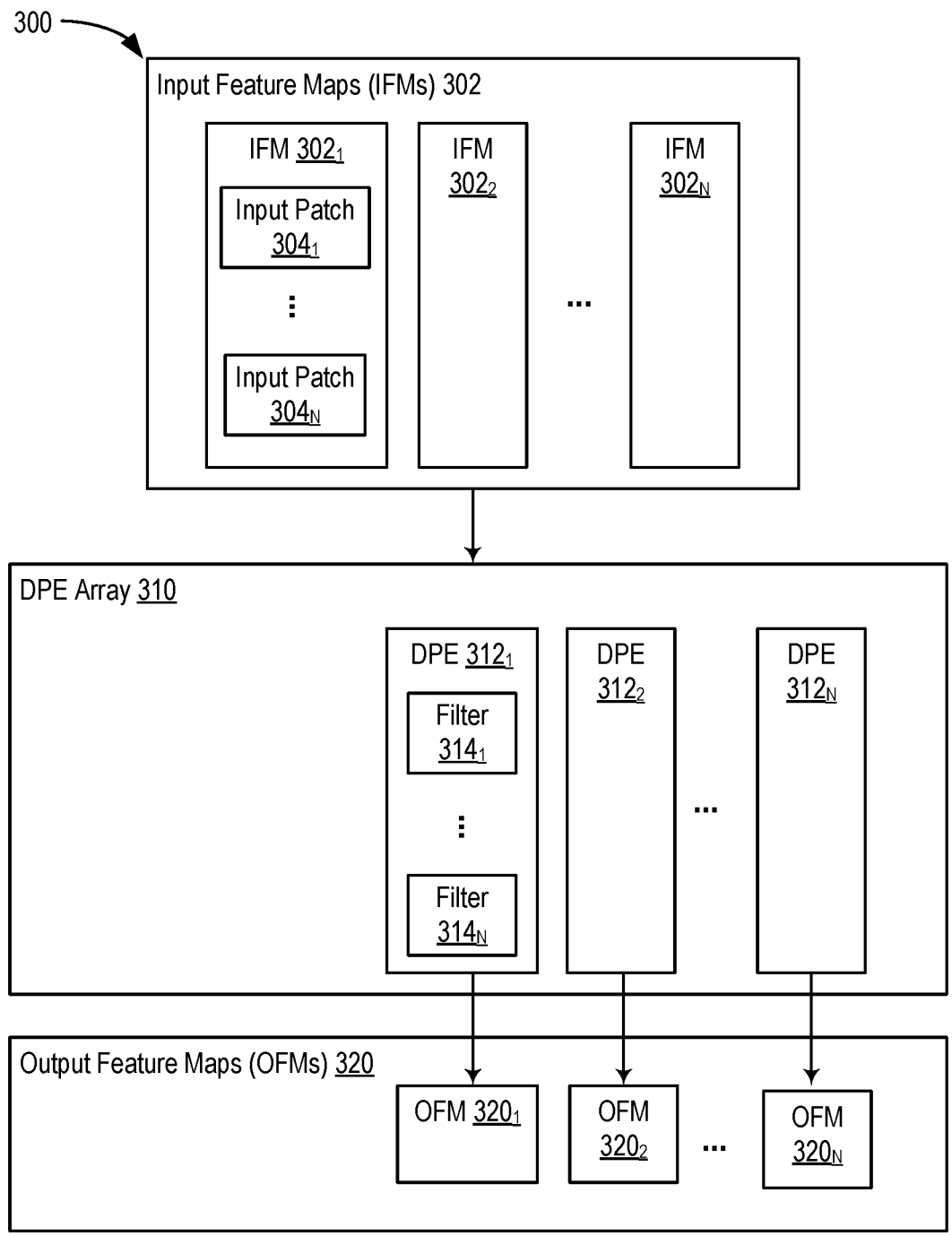
FIG. 3 is a high-level view of processing involved in a convolution layer of a neural network.

FIG. 3 depicts a high-level view of the processing involved in a convolution layer that can be a part of the neural network in FIG. 2. For example, the layers labeled Layer Type A in FIG. 2 can be convolution layers to be executed using the reconfigurable IC 120 in FIG. 1. In the exemplary convolution layer, the DPE array 310 takes in the input feature maps (IFMs) 302 and generates output feature-maps (OFMs) 320. In some embodiments, the DPE array 310 can be the DPE array 130 of FIG. 1.

Each IFM $302_1$-$302_N$ comprises any number of input patches $304_1$-$304_N$, and can have any size (e.g., 3x3). The DPE array 310 contains any number of DPEs (also known as kernels and kernel processors) $312_1$-$312_N$, and each DPE contains filters $314_1$-$314_N$ of a size matching the size of the input patch of the IFM (e.g., 3x3). The number of filters $314_1$-$314_N$ corresponds to the number of input feature maps. For example, if the convolution layer has four input feature maps, then each DPE would have four filters. The number of OFMs $320_1$-$320_N$ corresponds to the number of DPEs $312_1$-$312_N$, and each DPE $312_1$-$312_N$ generates an OFM $320_1$-$320_N$.

In this exemplary convolution layer, the DPE array 310 takes in the IFMs 302. Each DPE $312_1$-$312_N$ of the DPE array 310 processes each IFM $302_1$-$302_N$. For example, DPE $312_1$ takes in and processes IFM $302_1$, IFM $302_2$, and so on. Also DPE $312_2$ takes in and processes IFM $302_1$, IFM $302_2$, and so on until each DPE $312_1$-$312_N$ of the DPE array 310 takes in and processes each IFM $302_1$-$302_N$.

In the processing of each IFM $302_1$-$302_N$, the DPE $312_1$-$312_N$ convolves the input patch $304_1$-$304_N$ of each IFM $302_1$-$302_N$ with each filter $314_1$-$314_N$ and accumulates the output with the previous convolution output. For example, where there are four IFM, the DPE $312_1$ convolves the input patch $304_1$ of the first IFM $302_1$ with the filter $314_1$, the input patch $304_1$ of the second IFM $302_2$ with the filter $314_2$, the input patch $304_1$ of the third IFM $302_3$ with the filter $314_3$, and the input patch $304_1$ of the fourth IFM $302_4$ with filter $314_4$. In the example, after the second convolution, the DPE $312_1$ accumulates the second output with the first; after the third convolution, the DPE array 310 accumulates the third output with the first and second; and after the fourth convolution, the DPE array 310 accumulates the fourth output with the first, second, and third. In the example, each of the four IFMs results in 9 multiply-accumulates, and thus 36 multiple accumulates for 3x3 filter size generate one output data point in the OFM $320_1$. To get the next output data point in the OFM $320_1$, the DPE $312_1$ takes in the next input patch $304_2$ of the IFM $302_1$ and repeats the above processing.

In embodiments where the neural network involves image processing, the input data comprises pixels of input feature maps and the output data comprises pixels of the output feature maps. In such embodiments, the input data points for processing by the NNUs of the DPE array are pixels from the input images, and the output data points are pixels of the output images.

Figure 4:
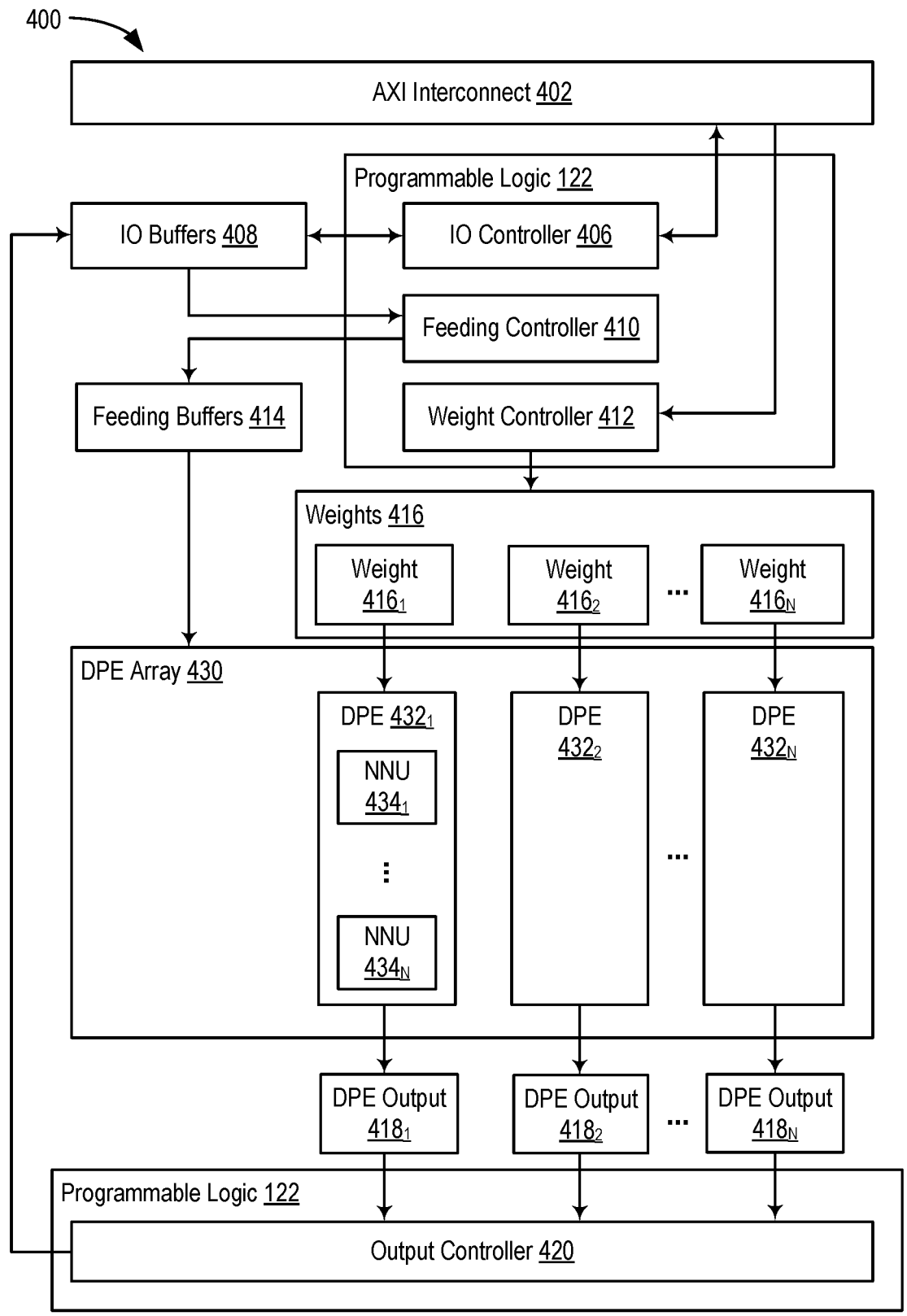
FIG. 4 is a block diagram of the hardware architecture of a neural network reconfigurable IC, in accordance with the embodiments disclosed.

FIG. 4 is a block diagram of the hardware architecture of a reconfigurable IC, in accordance with the embodiments disclosed, that can execute a neural network, such as the neural network 200 of FIG. 2. The reconfigurable IC 400, in the exemplary embodiment, includes components designed to process data through layers of a neural network, including the most compute-intensive layers: the convolution layer. The reconfigurable IC 400 can also be used with other types of neural networks and artificial intelligence applications.

In the exemplary embodiment, the reconfigurable IC 400 comprises an internal interconnect 402; programmable logic 122 implementing an IO controller 406, a feeding controller 410, a weight controller 412, and an output controller 420; IO buffers 408, feeding buffers 414, and a DPE array 430. The DPE array 430 comprises weight buffers $416_1$-$416_N$, DPEs $432_1$-$432_N$, and output buffers $418_1$-$418_N$. The examples herein can be useful in any type of hardware architecture of reconfigurable IC.

In the exemplary embodiment, the internal interconnect 402 (e.g., an Advanced Extensible Interface (AXI) interconnect) of the reconfigurable IC 400 connects the reconfigurable IC 400 with the other components of the reconfigurable IC (not illustrated in FIG. 4) (e.g., the programmable logic, control logic, and memory). In one embodiment the internal interconnect 402 communicatively couples the reconfigurable IC 400 with a host computer, such as the host computer 102 of FIG. 1.

In the exemplary embodiment, the IO controller 406 of the reconfigurable IC 400 accesses and receives data, including input image data, IFMs, and/or activation outputs stored in external memory (e.g., DRAM) through the internal interconnect 402. The IO controller 406 stores the data from external memory in the IO buffers 408. The reconfigurable IC 400 partitions the IO buffers 408 into ping-pong buffers: iStage buffers, which hosts input data, and oStage buffers, which hosts output data from the reconfigurable IC 400. Ping-pong buffers (also referred herein as double-buffers) are discussed in further detail below.

In the exemplary embodiment, once the IO controller 406 has stored data in the IO buffers 408, the feeding controller 410 reads the iStage buffers of the IO buffers 408 and populates the feeding buffers 414. The feeding buffers 414 feed the DPE array 430 with the input data.

Similarly, the weight controller 412 reads in weights and parameters (cumulatively referred herein as "weight data") stored in external memory (e.g., DRAM) and stores this data in weight buffers $416_1$-$416_N$ (also referred to as kbuff or kBuff herein) of the DPE array 430. In some embodiments, the weight data includes filters to include in processing the input data by the DPE array.

In the exemplary embodiment, the DPE array 430 performs multiply-accumulates (MAC) operations on the input data from the feeding buffers 414 and the weight data from the weight buffers $416_1$-$416_N$ to generate the output data points of the OFMs of layers of the neural network. The DPE array 430 is organized so that the MACs and/or compute operations can, in parallel, process multiple data points across multiple output feature-maps.

The DPE array 430 comprises a plurality of DPEs $432_1$-$432_N$, each DPE comprising a plurality of neural network units (NNUs) $434_1$-$434_N$. In one embodiment, the NNUs within a DPE $432_1$-$432_N$ work in parallel on different data points corresponding to one output feature-map. Accordingly, each DPE works on different output feature-maps in parallel. Each DPE write its output to the DPE output buffers $418_1$-$418_N$, each DPE output buffer corresponding to one DPE.

The output controller 420 writes the contents of the DPE output buffers $418_1$-$418_N$ to the oStage buffers of the IO buffers 408, and the IO controller 406 writes the contents of the oStage buffers of the IO buffers 408 to external memory (e.g., DRAM) through the internal interconnect 402.

In a further embodiment, the reconfigurable IC 400 comprises two features to optimize fetches by the DPEs. With one feature, the reconfigurable IC 400 decides the burst length of the fetch requests from the weight controller 412 based on the available storage in the weight buffer (both the weight ping buffer $412_1$ and the weight pong buffer $412_2$) and the size of the filters of the DPEs. The reconfigurable IC 400 calibrates the number of filters of the DPEs that can be pre-fetched with each request from the weight controller 412. The reconfigurable IC 400 then uses the parameters to decide on the burst length of the fetch requests by the DPE. The burst length decides the efficiency of the memory subsystem.

With the second feature, where the available storage in the weight buffers $416_1$-$416_N$ stores the corresponding weight data for the DPEs of a layer, the reconfigurable IC 400 fetches the corresponding weight data for the DPEs only once and the suppresses repeated fetches.

Figure 5:
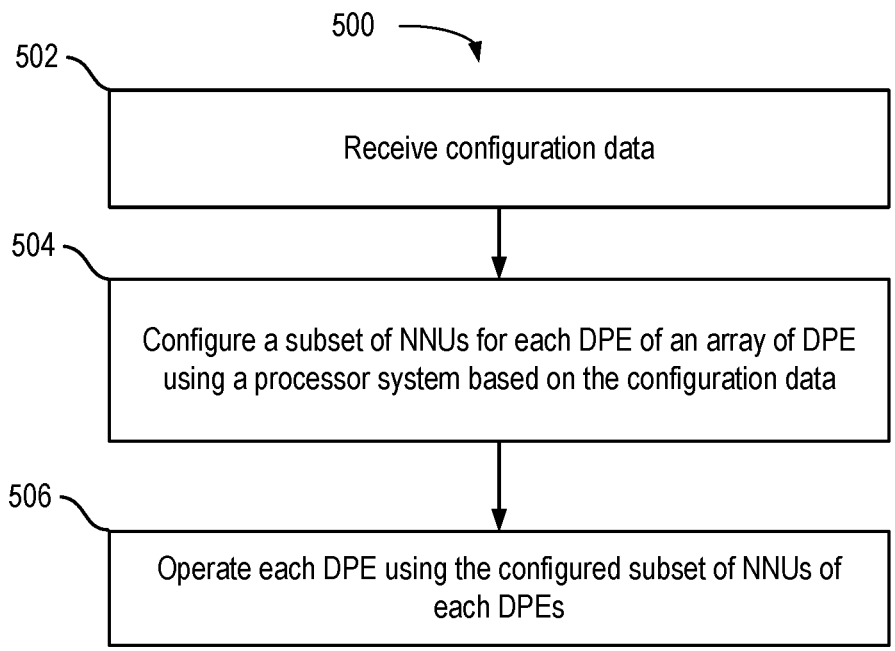
FIG. 5 illustrates example operations performed by a reconfigurable IC, according to embodiments of the present disclosure.

FIG. 5 illustrates example operations 500 performed by a reconfigurable IC to execute layers of a neural network, according to embodiments of the present disclosure. In some embodiments, the reconfigurable IC can be the reconfigurable IC 400 of FIG. 4.

Operations 500 begin, at 502, when the reconfigurable IC receives configuration data. This configuration data can come from a host computer, such as the host computer 102 of FIG. 1, and can include information about NNUs of DPEs of a DPE array of the reconfigurable IC, and about the DPEs of the DPE array. The configuration data can also include configurations of the various storage structures of the reconfigurable IC, such as the depths of the IO buffers 408, and the weight buffers $416_1$-$416_N$. In some embodiments, receiving configuration data includes receiving a neural network model having a plurality of layers.

At 504, operations 500 continue with the reconfigurable IC configuring a subset of DPE of an array of DPEs using a host based on the configuration data to process input data for a layer of the neural network model. As mentioned, the reconfigurable IC can have any number of DPEs and any number of NNUs hardwired, and the configuration data allows for subset of the DPEs to be used and for a subset of the NNUs of the subset of DPEs to be used.

At 506, operations 500 continue with the reconfigurable IC configuring a subset of NNUs for each DPE of an array of DPEs using a host based on the configuration data to process a portion of the input data based on the layer of the neural network model. As mentioned, the reconfigurable IC can have any number of DPEs and any number of NNUs hardwired, and the configuration data allows for subset of the DPEs to be used and for a subset of the NNUs of the subset of DPEs to be used.

At 508, operations 500 continue operating each DPE using the configured subset of NNUs of each DPEs. In some embodiments, operations 500 continue with processing, using the selected NNUs of each configured DPE, a portion of the different input data sets to generate a portion of output data for the layer of the neural network model. In such embodiments, the portion of output data from each of the selected NNUs together form the output data.

Figure 6:
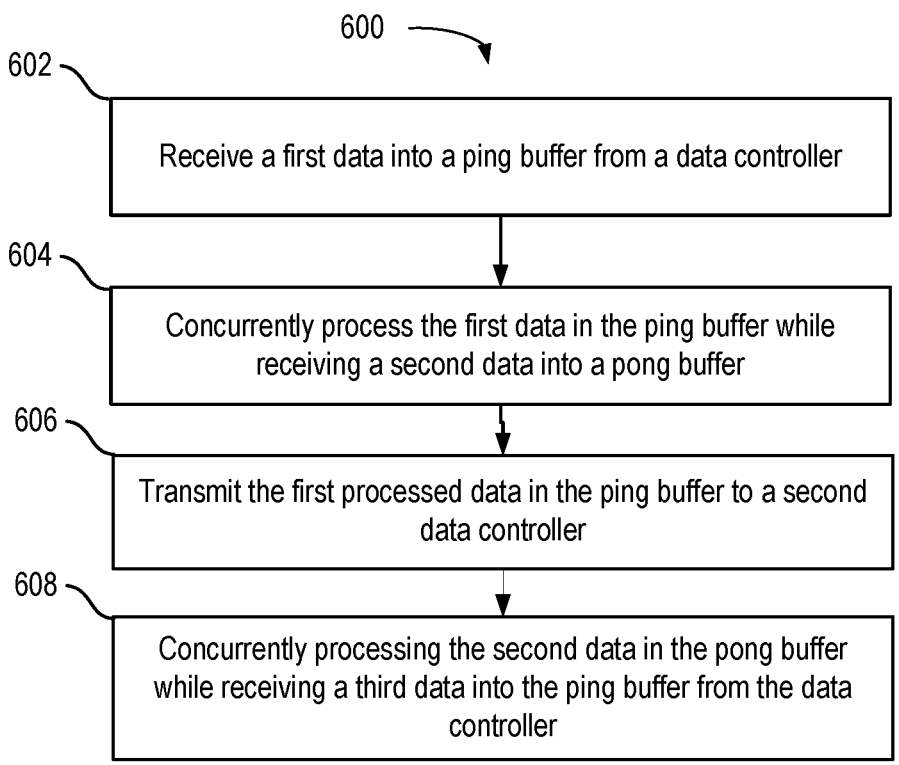
FIG. 6 illustrates example operations performed by a reconfigurable IC, according to embodiments of the present disclosure.

FIG. 6 illustrates example operations 600 performed by a reconfigurable IC, according to embodiments of the present disclosure. In one embodiment, the reconfigurable IC can be the reconfigurable IC 400 of FIG. 4.

Operations 600 begin, at 602, by receiving first data into a ping buffer from a data controller. The data controller can be the IO controller 406, the feeding controller 410, the weight controller 412, or the output controller 420 of the reconfigurable IC 400 of FIG. 4. The data from the data controller can comprise input data, such as IFMs, or weight data.

At 604, operations 600 continue by concurrently processing the first data in the ping buffer while receiving second data into a pong buffer. The ping buffers and the pong buffers are discussed in further detail below.

At 606, operations 600 continue by transmitting the first processed data from step 604 into the ping buffer into a second data controller.

At 608, operations 600 continue by concurrently processing the second data in the pong buffer while receiving a third data into the ping buffer from the data controller.

Figure 7:
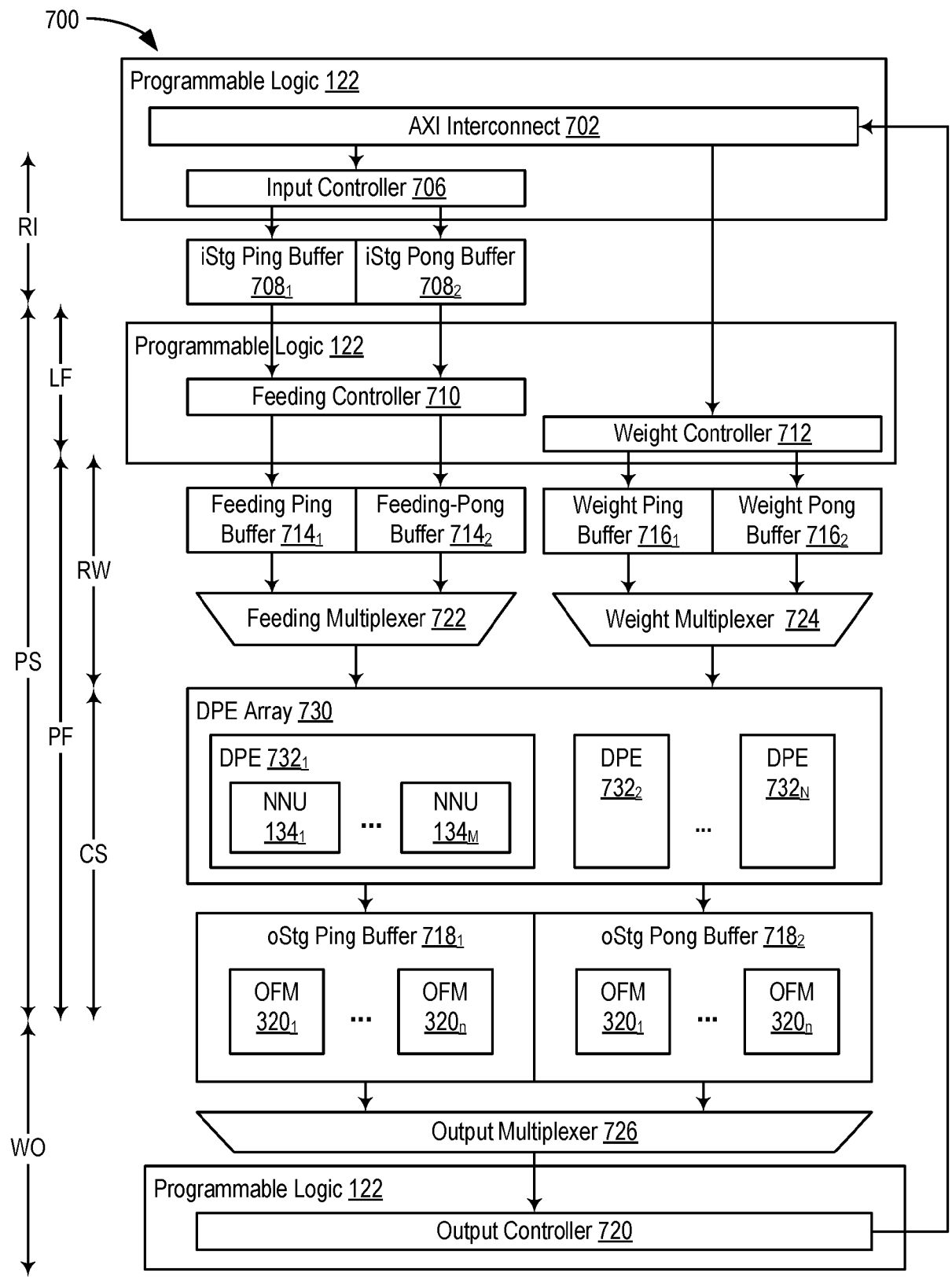
FIG. 7 illustrates the data flow of the hardware architecture of a neural network reconfigurable IC, in accordance with the embodiments disclosed.

Example Data Flow of Hardware Architecture of a Neural Network Reconfigurable IC FIG. 7 illustrates the data flow of the hardware architecture of a neural network reconfigurable IC, in accordance with the embodiments disclosed. The data flow 700 reflects the parallel processing enabled on a reconfigurable IC, such as the reconfigurable IC 400 of FIG. 4, to generate the set of output locations in an OFM and on a set of OFMs. FIG. 7 also illustrates the different states in the exemplary architecture, and the components involved in each of these states. The exemplary architecture comprises several states: a ReadInput (RI) state, a ProcessStage (PS) state, a WriteOutput (WO) state, a LoadFeedingBuff (LF) state, a ProcessFeedingBuff (PF) state, a ReadWeights (RW) state, and a Compute-and-Store (CS) state. In one embodiment, the CS state breaks down further into a Compute (C) state and a Store (S) state. FIGS. 8-11 illustrate the state diagrams and data flows in the neural network reconfigurable IC architecture, and provide further details for each state detailed in FIG. 5.

In the exemplary embodiment, storage structures (e.g., buffers) of the reconfigurable IC are ping-pong-buffered to allow for processing of one buffer while the IO controller writes to the other buffer or reads from the external memory (e.g., DRAM) to the other buffer. This scheme hides the external memory access latencies and data transfer latencies between on-chip buffers behind compute processes of the reconfigurable IC. This ping-pong-buffering of each storage structure results in a ping buffer and a pong buffer for each storage structure. As illustrated in FIG. 7, the iStage buffers of the IO buffers result in the iStage ping buffer $708_1$ ("iStage" shortened to "iStg") and iStage pong buffer $708_2$. Similarly, with the ping-pong-buffering, the feeding buffers result in the feeding ping buffer $714_1$ and feeding pong buffer $714_2$; the weight buffers result in the weight ping buffer $716_1$ and weight pong buffer $716_2$; and the oStage buffers result in the oStage ping buffer $718_1$ ("oStage" shortened to "oStg") and oStage pong buffer $718_2$.

In the exemplary embodiment, data first passes through the internal interconnect 702 from external memory (not illustrated in FIG. 7) of the reconfigurable IC. Of the data from the internal interconnect 702, the IO controller 706 receives input data from the internal interconnect 702 while the weight controller 712 receives weight data (including parameter data) from the internal interconnect 702.

The IO controller 706 stores the input data in iStage ping buffer $708_1$ and iStage pong buffer $708_2$. In the exemplary embodiment, when the IO controller 706 stores the input data in these two buffers, the IO controller 706 stores only a subset of the input data into iStage ping buffer $708_1$ and stores the rest of the input data into the iStage pong buffer $708_2$. In some embodiments, the IO controller 706 is implemented on programmable logic 122.

The feeding controller 710 reads contents of from iStage ping buffer $708_1$ and iStage pong buffer $708_2$ and passes the contents the feeding ping buffer $714_1$ and feeding pong buffer $714_2$. In one embodiment, the data from the iStage ping buffer $708_1$ can pass to the feeding ping buffer $714_1$, and the data from the iStage pong buffer $708_2$ can pass to the feeding pong buffer $714_2$. In one embodiment, the data from the iStage ping buffer $708_1$ can pass to the feeding pong buffer $714_2$, or the data from the iStage pong buffer $708_2$ can pass to the feeding ping buffer $714_1$. In some embodiments, the feeding controller 710 is implemented on programmable logic 122.

The reconfigurable IC multiplexes the contents of the feeding ping buffer $714_1$ and feeding pong buffer $714_2$ via a feeding multiplexer 722 for the DPE array 730. The feeding multiplexer 722 passes to the DPE array 730 the contents of one of the ping-pong buffers thereby emptying the buffer while withholding the contents of the other, and then while reconfigurable IC fills the emptied buffer of the ping-pong buffers, the feeding multiplexer 722 passes on to the DPE array 730 the contents of the other buffer. This alternating multiplexing pattern continues between the LF state and the PF state, discussed in further details below.

In the exemplary embodiment, when the feeding controller 710 transmits the input data to the feeding ping buffer $714_1$ and feeding pong buffer $714_2$, the weight controller 712 receives weight data (including parameter data) from external memory through the internal interconnect 702. Like with the other controllers and buffers, the weight controller 712 feeds the weight data to the weight ping buffer $716_1$ and the weight pong buffer $716_2$. In some embodiments, the weight controller 712 is implemented on programmable logic 122.

The reconfigurable IC then multiplexes the weight data via a weight multiplexer 724 and passes the data to the DPE array 730. The weight multiplexer 724 acts in a similar fashion as the feeding multiplexer 722 with an alternating multiplexing pattern between the RW state and the CS state.

The DPE array 730 takes in the input data from the feeding multiplexer 722 and the weight data from the weight multiplexer 724 and performs computations on the input data and the weight data to generate output data. In one embodiment, the DPE array 730 generates data points of the output feature-maps as output data. The DPE array 730 stores the output data in the output buffers comprising the oStage ping buffer $718_1$ and oStage pong buffer $718_2$, which hosts the output data to be sent to external memory via the internal interconnect 702. In the exemplary embodiment, the DPE array comprises N number of DPEs, and each DPE comprises M number of NNUs.

In one embodiment, because of ping-pong-buffering, the oStage buffers results in the oStage ping buffer $718_1$ and oStage pong buffer $718_2$. The reconfigurable IC multiplexes the output data in the oStage ping buffer $718_1$ and oStage pong buffer $718_2$ via an output multiplexer 726 to pass to the output controller 720. The output multiplexer 726 acts in a similar fashion as the feeding multiplexer 722 and the weight multiplexer 724 with the alternating multiplexer pattern in the PS state and the WO state. The output controller 720 transmits the accumulated output data to external memory via the internal interconnect 702. In some embodiments, the output controller 720 is implemented on programmable logic 122.

In one embodiment, the reconfigurable IC can configure its buffers (e.g., iStage buffers and oStage buffers) using various design and performance requirements. Accordingly, based on the available internal storage on the reconfigurable IC, the reconfigurable IC may be unable to store the rows of the IFMs and OFMs in internal storage (e.g., iStage buffers and oStage buffers). Where the reconfigurable IC cannot store the rows of the IFMs and the OFMs, the reconfigurable IC generates the entire set of OFMs in multiple iterations using the data-flow described herein. In each iteration, the reconfigurable IC fetches only a few rows of the IFMs and thereby generates partial rows of output. The reconfigurable IC then writes these partial rows of the OFMs to external memory. To mitigate the impact of memory access latencies due to the iterative approach, the reconfigurable IC uses the hierarchical double-buffering (ping-pong) scheme. Therefore, the storage structures of the reconfigurable IC are ping-pong-buffered. As mentioned, in this ping-pong scheme, either the ping structure is processed and the pong structure is busy with memory accesses or the ping structure is busy with memory accesses and the pong structure is processed.

In an example data flow of the hardware architecture of a neural network reconfigurable IC, FIG. 4 can involve an exemplary convolution layer with 16 OFMs of size 11x11 used for image processing. Also, with the example data flow, FIG. 4 can involve an example hardware configuration of four DPEs with each DPE hosting 32 NNUs. Accordingly, each DPE generates four OFMs. Because of the number of DPEs and NNUs, the example data flow can involve multiple instances of different buffers of the neural network reconfigurable IC.

Based on the number of output rows that the oStage buffers can hold and certain other parameters (e.g., filter size and filter stride), the host computer programs the reconfigurable IC with the number of rows of the IFM to be fetched by the IO controller 706 into the iStage ping buffer 708$_1$ instance or the iStage pong buffer 708$_2$ instance.

In one embodiment, the feeding controller 710 then fetches a rectangular block of data points in the IFMs needed for processing 32 output pixels (assuming there are 32 NNUs and each NNU generates an output pixel) across the OFMs and loads the rectangular block of data points into the feeding buffer instance of each NNU. Because there are 32 NNUs assumed in the hardware configuration, there are 32 feeding buffer instances or 16 feeding buffer instances if the buffer instances are dual-ported.

While the feeding controller 710 loads the data into the feeding buffers, the weight controller 712 fetches weight data corresponding to the first four OFMs and loads the data into the weight ping buffer 716$_1$ instance. In one embodiment, the weight ping buffer 716$_1$ and weight pong buffer 716$_2$ are organized in banks based on the number of DPEs configured for processing the neural network.

The DPE array 730 then reads and processes the contents of the feeding ping buffer 714$_1$ instance and the weight ping buffer 716$_1$ to generate the first 32 data points (e.g., pixels) of the first four OFMs (OFM0, OFM1, OFM2, and OFM3). For example, the OFMs 320$_1$-320$_n$ stored in the oStage ping buffer 718$_1$ include the first four OFMs (OFM0, OFM1, OFM2, and OFM3). In the example data flow, each DPE processes the input data to generate the first 32 data of its corresponding OFMs, i.e., the first DPE generates OFM0, OFM4, OFM8, and OFM12; the second DPE generates OFM1, OFM4, OFM9, and OFM13; and so on.

While the DPE array processes the first 32 data points of the first 4 OFMs, the weight controller 712 fetches the weight data for the next four OFMs into the weight pong buffer 716$_2$. In the C state, the DPE array 730 then reads the feeding ping buffer 714$_1$ instance again and processes it using the data in the weight pong buffer 716$_2$ to generate the first 32 data points of the OFM4, OFM5, OFM6, and OFM7. Like with the previous OFMs, the OFMs 320$_1$-320$_n$ stored in the oStage ping buffer 718$_1$ include the second four OFMs (OFM4, OFM5, OFM6, and OFM7).

While the DPE array 730 processes with the first 32 data points of OFM4, OFM5, OFM6, and OFM7, the weight controller 712 fetches the weight data for the next four OFMs in the weight ping buffer 716$_1$ instance. In the C state, the DPE array then processes the feeding ping buffer 714$_1$ instance again with the contents of the weight ping buffer 716$_1$ to generate the first 32 data points of OFM8, OFM9, OFM10, and OFM11. Like with the previous OFMs, the OFMs 320$_1$-320$_n$ stored in the oStage ping buffer 718$_1$ include the third four OFMs (OFM8, OFM9, OFM10, and OFM11).

Similar to the above steps, the DPE array generates the first 32 data points of OFM12, OFM13, OFM14, and OFM15 using the contents of the feeding ping buffer 714$_1$ instance and the weight pong buffer 716$_2$. Like with the previous OFMs, the OFMs 320$_1$-320$_n$ stored in the oStage pong buffer 718$_2$ include the fourth four OFMs (OFM12, OFM13, OFM14, and OFM15).

The DPE array 730 repeats the previous read-and-process operations on the contents of the feeding pong buffer 714$_2$ instance to generate the next 32 data points of the 16 OFMs. Also, while the DPE array 730 repeats the previous read-and-process operations, the output controller 720 reads the contents of the oStage ping buffer 718$_1$ instance and writes the contents out to external memory over the internal interconnect 702.

Once the second set of 64 data points for the 16 OFMs are generated and written to the oStage pong buffer 718$_2$, the output controller writes the content of the oStage pong buffer 718$_2$ to the external memory over the internal interconnect 702.

In some embodiment, the reconfigurable IC can configure the storage structures, the number of DPEs, and the number of NNUs per DPE. This configurability scales down to smaller configurations based on the performance and area requirements. The reconfigurable IC can configure the depth of various buffers, such as the iStage buffers and the oStage buffers, to 1k, 2k, 4k, and 8k. The reconfigurable IC can also configure the depth of the weight buffers to 2k and 4k. The reconfigurable IC can configure the number of DPEs and can therefore have to 4, 8, or 16 DPEs. Additionally, the reconfigurable IC can configure the number of NNUs per DPE, such that the reconfigurable IC comprises 8, 16, 32, 40, 48, 56, or 64 NNUs per DPE. In one embodiment, the reconfigurable IC can comprise any combination of the above configurations.

FIGS. 8A-B illustrate reconfigurable IC states and the corresponding data flow of buffers of the neural network reconfigurable IC, in accordance with the embodiments disclosed. As mentioned with regard to FIG. 7, storage structures comprise ping-pong buffers to allow for processing of one buffer and writing/reading of another buffer. FIG. 8A illustrates an exemplary state diagram between the RI state 802, the PS state 804, and the WO state 806 and when the ping-pong buffers enter these states in the data flow 810. As used herein, the "Ping Buffers" refers to any ping buffer of ping-pong buffers, such as the iStage ping buffer 708$_1$, feeding ping buffer 714$_1$, and oStage ping buffer 718$_1$, and the "Pong Buffers" refers to any pong buffers of the ping-pong buffers, such as iStage pong buffer 708$_2$, feeding pong buffer 714$_2$, and oStage pong buffer 718$_2$ In the exemplary embodiment, during the RI state 802, the IO controller, such as the IO controller 706 from FIG. 7, reads in a set of rows of the input feature map and stores this set of rows in the iStage buffers. A driver, such as the driver 112 of FIG. 1, on a host, such as host computer 102 of FIG. 1, calibrates and configures the number of rows of the IFMs fetched from external memory. After the RI state 802, the reconfigurable IC enters the PS state 804 and during the PS state 804, the IO controller fetches weight data (including parameter data) from external memory and convolves this weight data with the input data using the Multiply-Accumulates (MAC) units arranged in the DPE array to form output data. Also during the PS state 804, the DPE array writes the output data to the oStage buffers. After the PS state 804, the WO state 806 begins, in which the reconfigurable IC multiplexes the output data in the oStage buffers via an output multiplexer, such as output multiplexer 726 of FIG. 7, and the output controller, such as the output controller 720 of FIG. 7, reads the output data and writes the output data out to external memory (e.g., DRAM). Then the cycle continues by returning back to the RI state 802 from the WO state 806 when the number of output rows of the OFM does not equal height of the OFM because the reconfigurable IC has not finished processing the entirety of the IFMs to generate the entire OFM.

FIG. 8B illustrate how the PS states hide the latencies of the RI and WO states using ping-pong buffers. Using the ping-pong buffering scheme, the ping buffers and the pong buffers comprise different states, and in one embodiment the states are mutually exclusive so that both the ping buffers and the pong buffers are not the same state. For example, the ping buffer cannot be in the RI state 802 at the same time as the pong buffer, as illustrated in the data flow 810.

During the RI state 802, the reconfigurable IC fetches a few rows of the IFMs from external memory and writes these rows to the iStage ping Buffer. After this, the PS state 804 begins and the DPE array, such as the DPE array 730 of FIG. 7, processes the data from the iStage ping buffer, such as the iStage ping buffer 708$_1$ of FIG. 7. While the reconfigurable IC processes the iStage ping buffer, the IO controller re-enters the RI state 802 and fills the iStage pong buffer, such as the iStage pong buffer 708$_2$. During the PS state 804 for the iStage ping buffer, the DPE array populates the oStage ping buffer with the OFM data. After the PS state 804 for the iStage ping buffer, the WO state 806 begins and the output controller works with the output multiplexer to read the data from the oStage ping buffer and write to external memory. While the output controller drains the data from the oStage ping buffer to the external memory, the DPE array fills the oStage pong buffer in the PS state 804.

FIGS. 9A-B illustrate reconfigurable IC states and the corresponding data flow of buffers of the neural network reconfigurable IC, in accordance with the embodiments disclosed. As mentioned, in the exemplary embodiment, the PS state implements the hierarchical ping-pong scheme to hide latency of loading the feeding buffers (such as the feeding ping buffer 714$_1$ and feeding pong buffer 714$_2$ of FIG. 7). The feeding buffer is also ping-pong-buffered and while the DPE array processes the feeding ping buffer, the feeding controller, such as the feeding controller 710 of FIG. 7, fills the feeding pong buffer. Accordingly the PS state comprises two states: the LoadFeedingBuffer (LF) state 902 and the ProcessFeedingBuff (PF) state 904.

In the exemplary embodiment, during the LF state 902, the feeding controller loads the contents of the iStage buffers (either iStage ping buffer 708$_1$ and iStage pong buffer 708$_2$) into the feeding buffers ping buffer. After the LF state 902 in which the feeding controller writes data into the feeding ping buffer, the PF state 904 comprises the DPE array reading data from the feeding ping buffer for processing. Also, while the reconfigurable IC processes the feeding ping buffer in the PF state 904, the feeding controller loads the feeding pong buffer in the LF state 902. This cycle between the LF state 902 and the PF state 904 of the ping and pong buffers continues until the number of data points is equal to the number of partial output rows to be generated by the reconfigurable IC multiplied by the height of the OFM to be generated.

As with FIGS. 8A-8B, using the ping-pong buffering scheme, the states of the ping buffers and the pong buffers are mutually exclusive so that both the ping buffers and the pong buffers are not the same state. For example, the ping buffer cannot be in the LF state 902 at the same time as the pong buffer, as illustrated in the data flow 910.

FIGS. 10A-B illustrate reconfigurable IC states and the corresponding data flow of buffers of the neural network reconfigurable IC, in accordance with the embodiments disclosed. In the exemplary embodiment, the PF state, which generates the OFMs using the input data and weight data, internally implements another level of a ping-pong-buffering scheme to hide the latency of weight data (including parameter data) fetched from external memory.

FIG. 10A illustrates the ping-pong scheme inside the PF state, which comprises two states: the ReadWeights (RW) state 1002 and Compute-and-Store (CS) state 1004. The weight controller, such as the weight controller 712 of FIG. 7, reads in input weight data for a given set of OFMs via the internal interconnect from external memory. In one embodiment, the weight controller writes to the weight ping buffer, such as the weight ping buffer 716$_1$ of FIG. 7, during the RW state 1002. Then, the CS state 1004 begins and the DPE array accesses and processes the data in the weight ping buffer. While the DPE array processes the weight ping buffer, the weight controller reads the weight data for the next set of OFM from external memory via the internal interconnect and writes the data to the weight pong buffer, such as the weight pong buffer 716$_2$ of FIG. 7. This cycle of reading by the weight controller and processing by the DPE array continues until the weight controller has fetched weight data for the OFMs. In one embodiment, the cycle between the RW state 1002 and the CS state 1004 continues while the number of DPEs is not equal to the number of OFMs generated.

In one embodiment, the weight data for the OFMs can fit in the weight buffers (both the weight ping buffer and the weight pong buffer), the weight controller fetches the data once from external memory thereby saving on memory latencies incurred due to repeated fetches of weight data from memory.

As with FIGS. 8A-8B and 9A-9B, using the ping-pong buffering scheme, the states of the ping buffers and the pong buffers are mutually exclusive so that both the ping buffers and the pong buffers are not the same state. For example, the ping buffer cannot be in the RW state 1002 at the same time as the pong buffer, as illustrated in the data flow 1010.

Figure 11A:
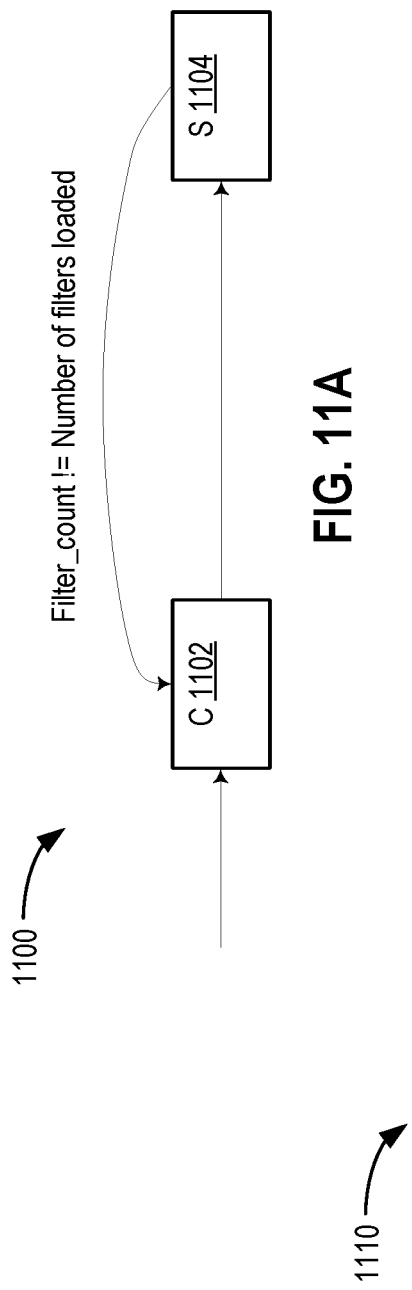
FIGS. 11A-B illustrate states and the corresponding data flow of buffers of the neural network reconfigurable IC, in accordance with the embodiments disclosed.
Figure 11B:
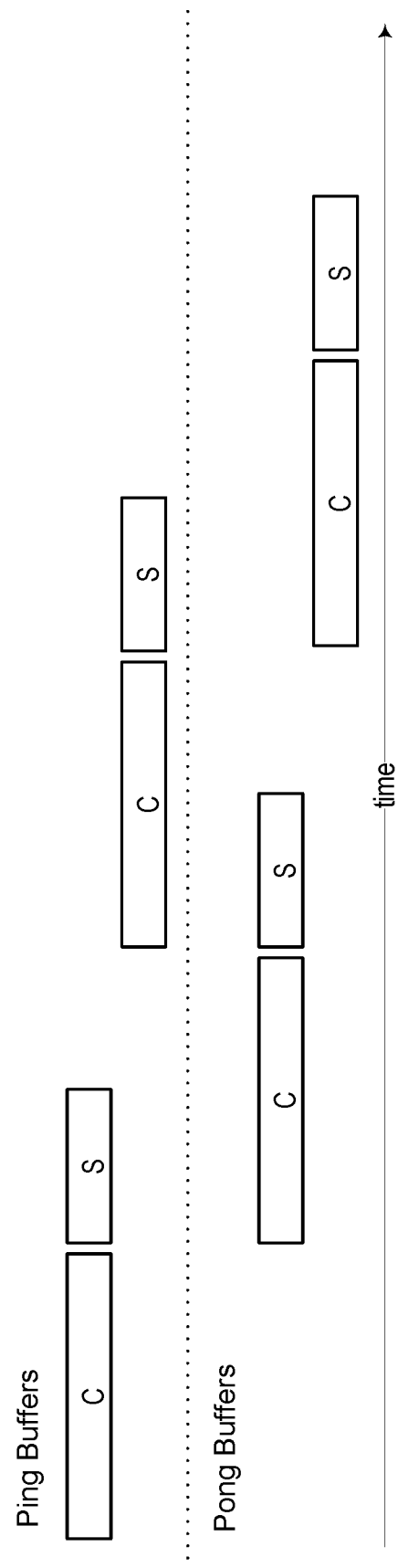

FIGS. 11A-B illustrate states and the corresponding data flow of buffers of the neural network reconfigurable IC, in accordance with the embodiments disclosed. In the exemplary embodiment, FIG. 11A describes the next-level of ping-pong scheme implements in the CS state (e.g., the CS states illustrated in FIGS. 10A-B) in more detail. The CS state comprises two states: a Compute (C) state 1102 and a Store (S) state 1104. In the C state 1102, DPE array reads the weight ping buffer and multiply-accumulates the data from the weight ping buffer element-wise. The DPE array accumulates the multiplied data in the feeding ping buffer. The final accumulated outputs are written to a results ping buffer (not illustrated). After this, during the S state 1104, the data is read from the results ping buffer and written to the oStage buffers. While the S state is busy writing to the oStage ping buffer, the C state 1102 is busy writing to the a results-pong buffer (not illustrated).. This cycle continues until the corresponding data point locations across the output feature-maps are generated. In one embodiment, the cycle between the C state 1102 and the S state 1104 continues while the number of DPEs is not equal to the number of DPEs loaded.

As with the previous figures, using the ping-pong buffering scheme, the states of the ping buffers and the pong buffers are mutually exclusive so that both the ping buffers and the pong buffers are not the same state. For example, the ping buffer cannot be in the C state 1102 at the same time as the pong buffer, as illustrated in the data flow 1110.

Example Neural Network Unit of Neural Network Reconfigurable IC

Figure 12:
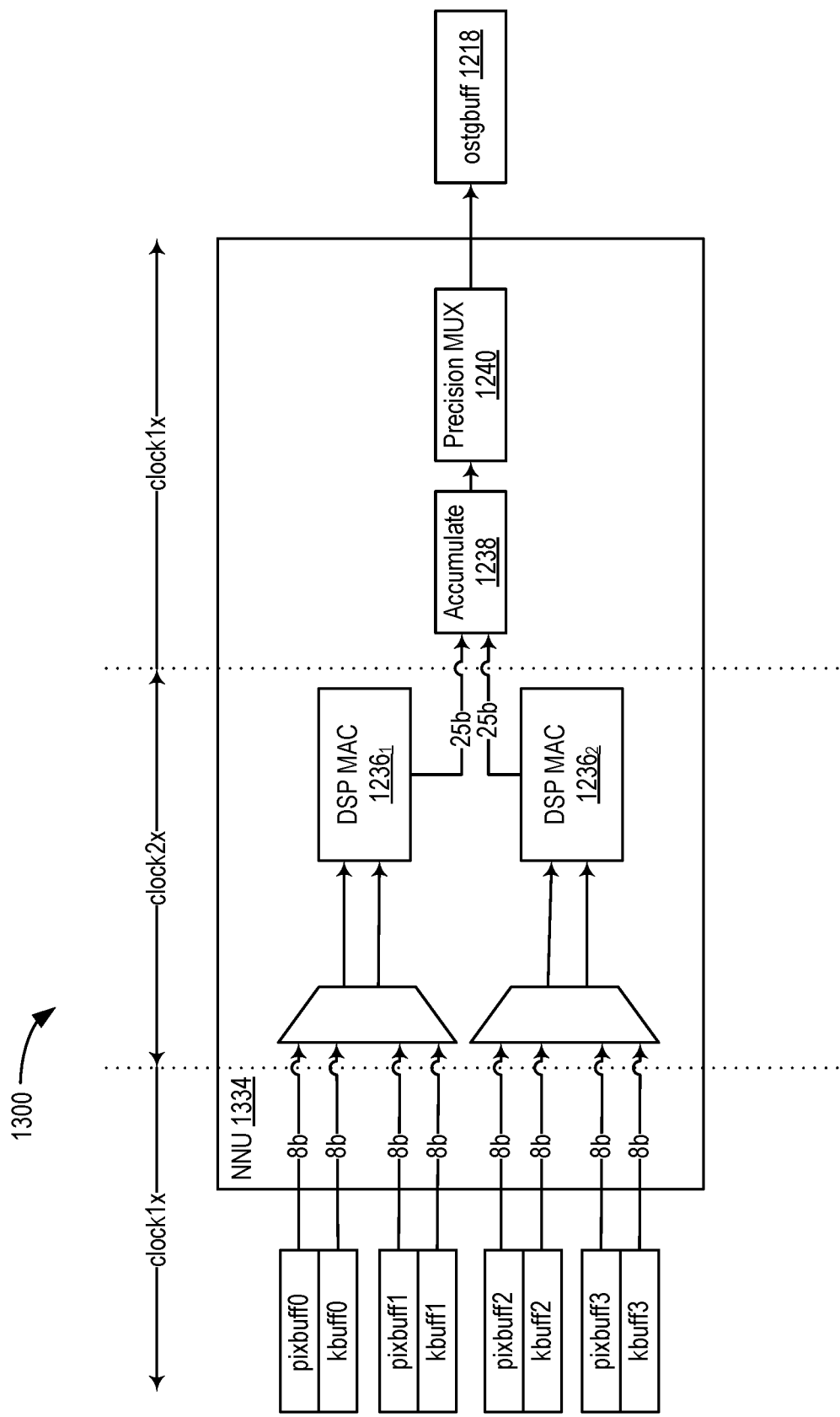
FIG. 12 illustrates an example data flow of the hardware architecture of a neural network reconfigurable IC, in accordance with the embodiments disclosed.
Figure 13:
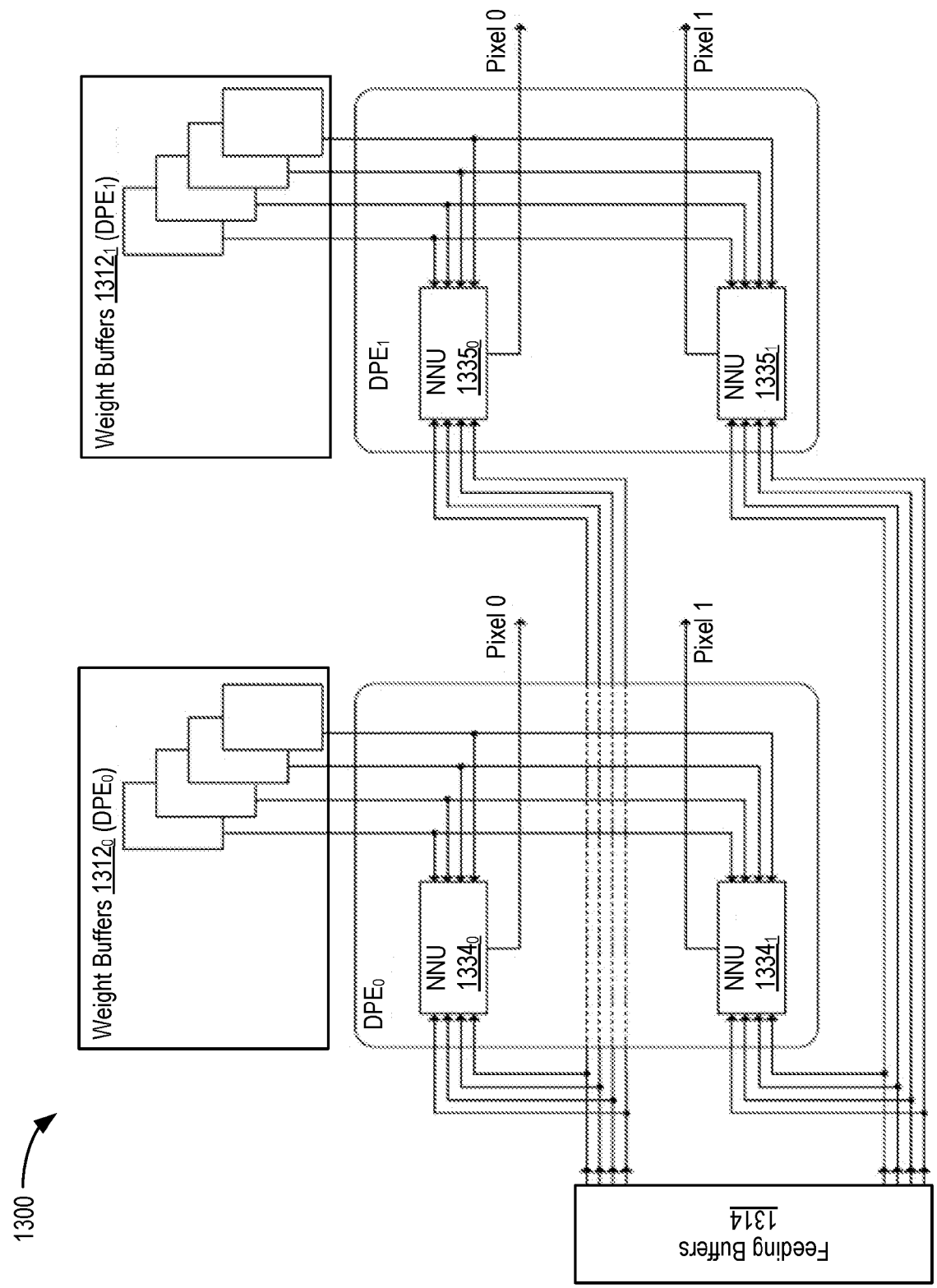
FIG. 13 is a block diagram of a neural network unit (NNU), in accordance with the embodiments disclosed.

FIG. 12 is a block diagram of a neural network unit (NNU), in accordance with the embodiments disclosed. The NNU is the core computing engine in the reconfigurable IC. In the exemplary embodiment, the micro-architecture of the NNU assumes the use of DSP48E2 hardened blocks on the reconfigurable IC. The NNU comprises of two DSPs operating at twice the frequency as the reconfigurable IC, as illustrated in FIG. 13. The DSPs are double-pumped by the reconfigurable IC with data from external memory, which hosts the input data and the weight data. As mentioned previously, the feeding buffers host the input data and the weight controller hosts the weight data. In the exemplary embodiment, both the feeding buffers and the weight buffers comprise a set of 4 BRAMs/SRAMs operating at an IC frequency (clock1x) and feed the DSPs operating at twice the reconfigurable IC frequency (clock2x). The IFMs and corresponding filters needed for an OFM are spread across the set of 4 SRAMs/BRAMs. The double-pumped DSP scheme applies to both 8b and 16b input data and weight data, although FIG. 13 assumes an 8b fixed point precision for the input data and weight data. Because both the input data and weight and parameter data use signed fixed point format and also because the reconfigurable IC architecture assumes the depth of the feeding buffers to be 1024b shared across two data points, the number of accumulations in the MAC implemented in the DSP cannot exceed 512 accumulations. Therefore, the reconfigurable IC hardware assumes the accumulator width from the DSP MAC to be 25b.

In the exemplary embodiment, the double pumped DSP scheme doubles the throughput of the reconfigurable IC. One configuration of the DSP48E2 hard-macros allows for the performance of 2 MACs at 6b fixed-point precisions (both input data and weight data at 6b precision). Accordingly, this int6 scheme overlaid on the double-pump scheme quadruples the throughput of the reconfigurable IC.

FIG. 13 is an example data flow of a neural network reconfigurable IC, in accordance with the embodiments disclosed. As mentioned, each DPE of the DPE array comprises a set of NNUs and the NNUs each generate a data point in an OFM in parallel. Performance requirements and resource budgets determine the configuration of the number of NNUs and DPEs. In the exemplary embodiment, the DPE array comprises two DPEs and each DPE has 2 NNUs. The NNUs of $DPE_0$ (NNU $1334_0$ and NNU $1334_1$) and $DPE_1$ (NNU $1335_0$ and NNU $1335_1$) take in data from the feeding buffers 1314 and from the weight buffers $1312_0$ and $1312_1$ (based on the corresponding DPE) and each NNU outputs a data point for an OFM.

Example Data Organization for Neural Network Reconfigurable IC

Figure 14:
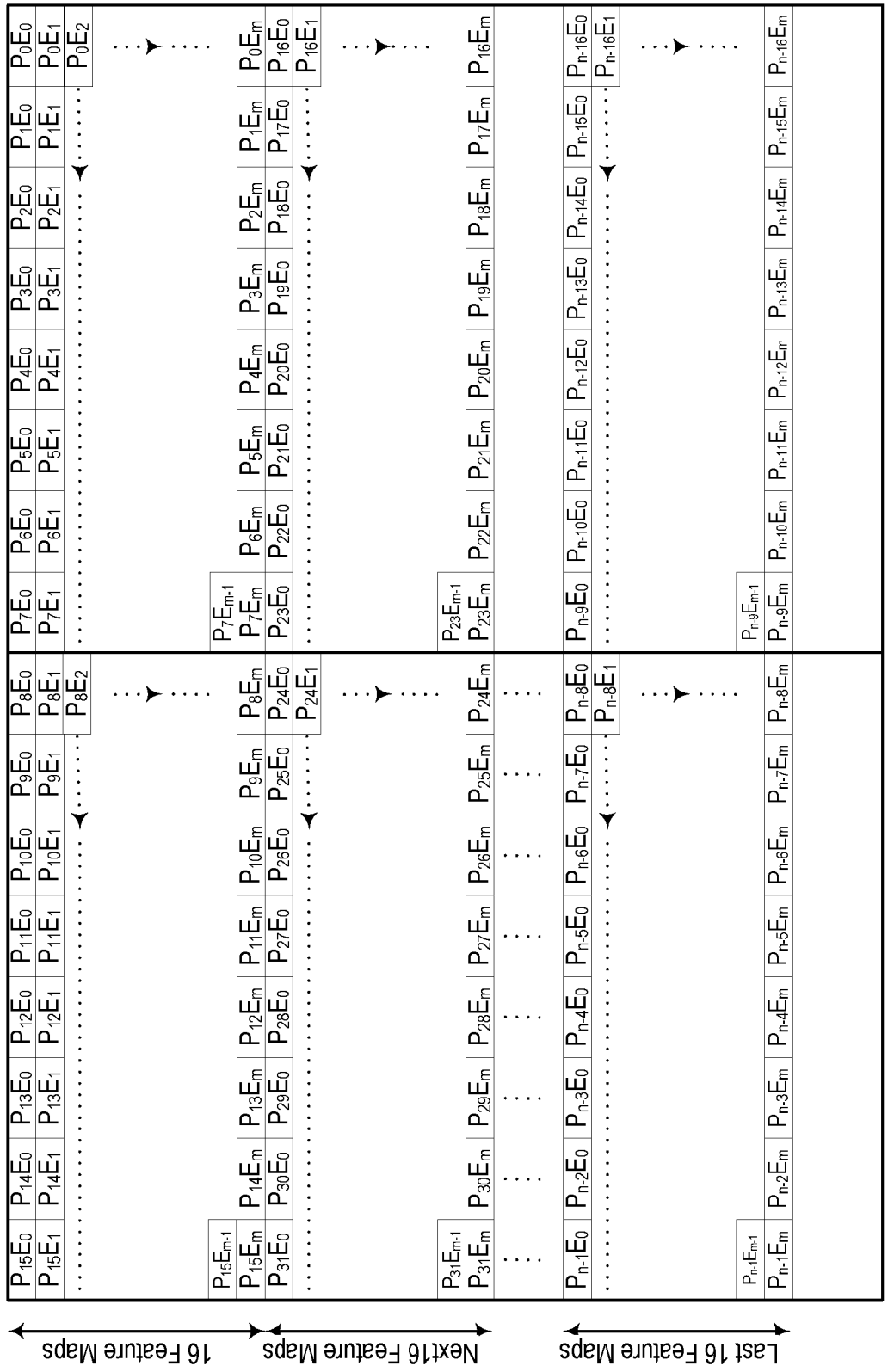
FIG. 14 illustrates the data organization in external memory, in accordance with the embodiments disclosed.

FIG. 14 illustrates the data organization in external memory, in accordance with the embodiments disclosed. The architecture of the DPEs dictates the data organization in the various buffers of the reconfigurable IC. In the exemplary embodiment, external memory stores the feature-maps (also referred to as planes) (either IFM or OFM), and these feature maps are arranged in sets of 16. Within each set of 16 feature maps, the external memory stores the data points in an interleaved fashion. In the exemplary data organization 1400, "$P_n$" represents the nth-plane (either IFM or OFM) and "E" represents an element within a plane.

Figure 15:
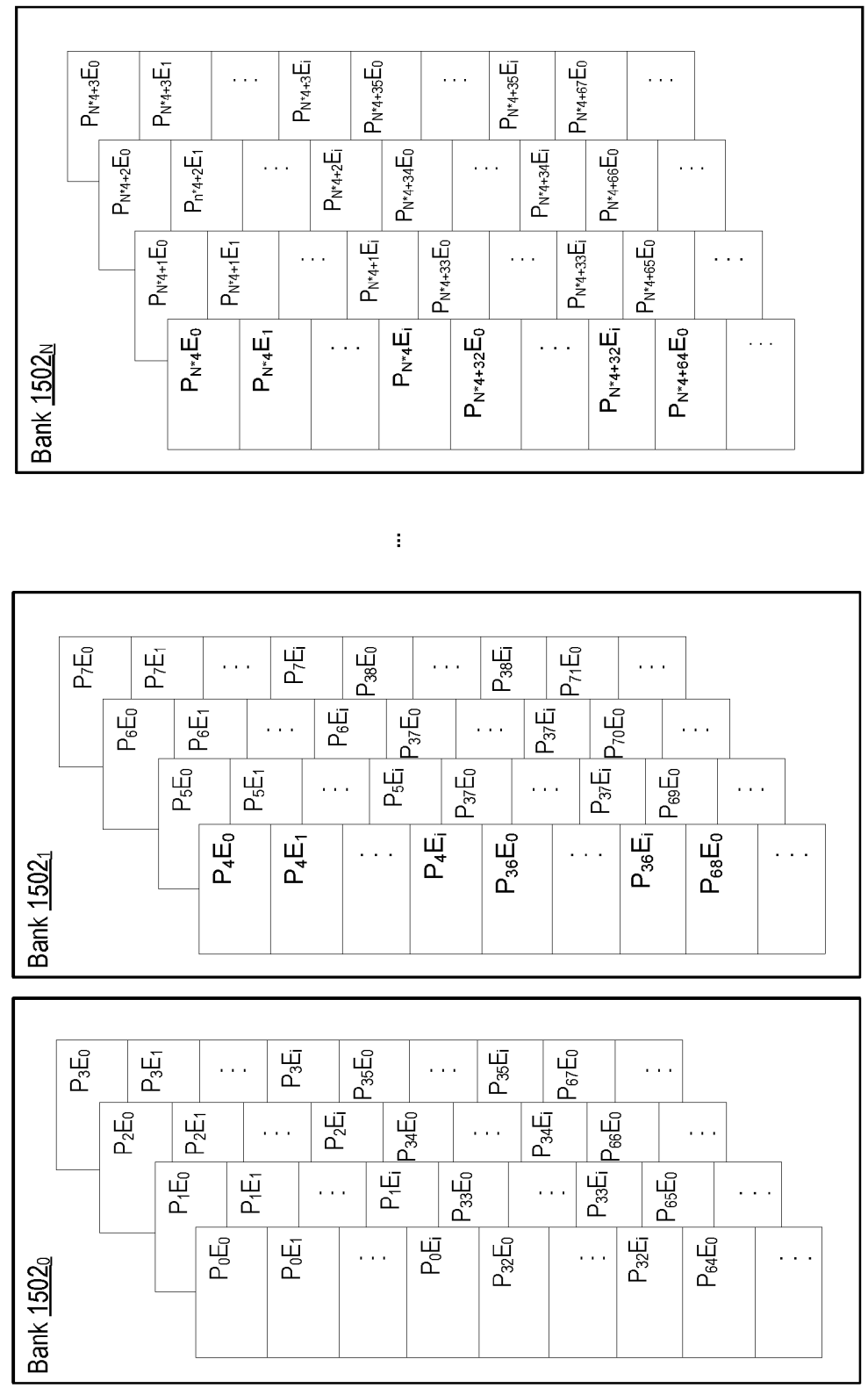
FIG. 15 illustrates the data organization in buffers, in accordance with the embodiments disclosed.

FIG. 15 illustrates the data organization in buffers, in accordance with the embodiments disclosed. Specifically, FIG. 15 illustrates the data organization in the iStage buffers on a reconfigurable IC, such as the reconfigurable IC 120 of FIG. 1. In the exemplary data organization 1500, "$P_n$" represents the nth-plane (IFM) and "E" represents an element within a plane.

In the exemplary embodiment, the reconfigurable IC organizes the iStage buffers as eight banks of storage with each bank consisting of four sub-banks. In one embodiment, the iStage Buffer can be viewed as an 8x4 set of block or bridging random access memory (BRAM) on an IC. The reconfigurable IC configures the depth of each sub-bank based on the performance and area requirements. Because the output element in an OFM requires input elements across the IFMs, the reconfigurable IC fetches a set of rows across the IFMs into the iStage buffers. Depending on the size of the iStage buffer and the number of IFMs and the resolution of the IFMs, the set of row can represent a subset of rows in the IFMs or the complete IFMs.

In an exemplary embodiment, because the input to the first layer in a neural network is typically an image which comprises 4 planes (IFMs), the data organization in the iStage buffers for the first layer is different. For the first layer, the reconfigurable IC files the first bank of RAMs with few rows of the input image with R, G, B planes (IFMs) residing in separate sub-banks. The fourth sub-bank is loaded with zeros. The second bank of RAMs is filled with the next few rows of the input image and so on.

In one embodiment, the organization of the oStage buffers, such as the oStage ping buffer $718_1$ and oStage pong buffer $718_2$ of FIG. 7, resembles the organization of the iStage buffers and the data organization of the oStage buffer also resembles that of the iStage buffers.

Figure 16:
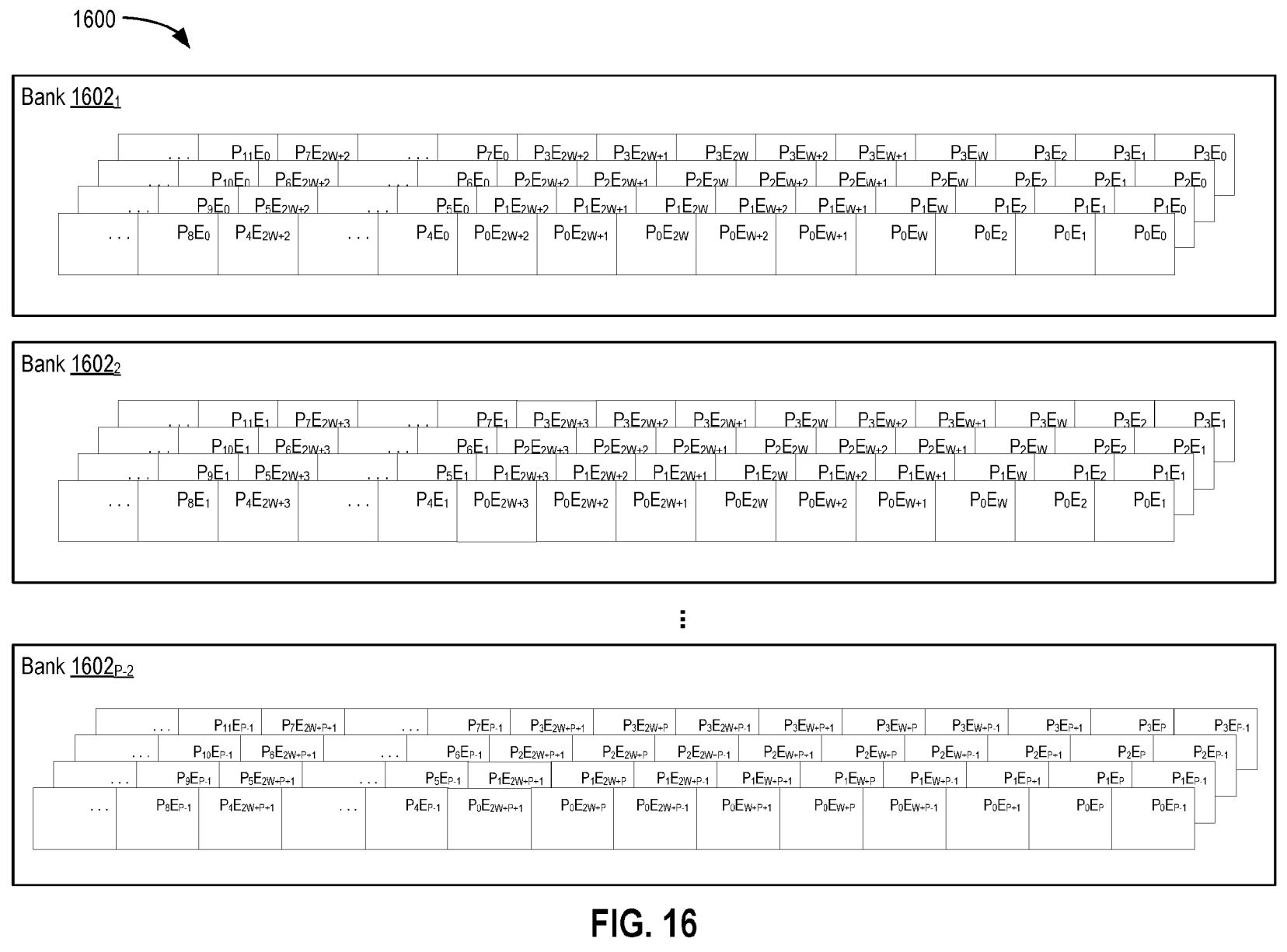
Figure 17:
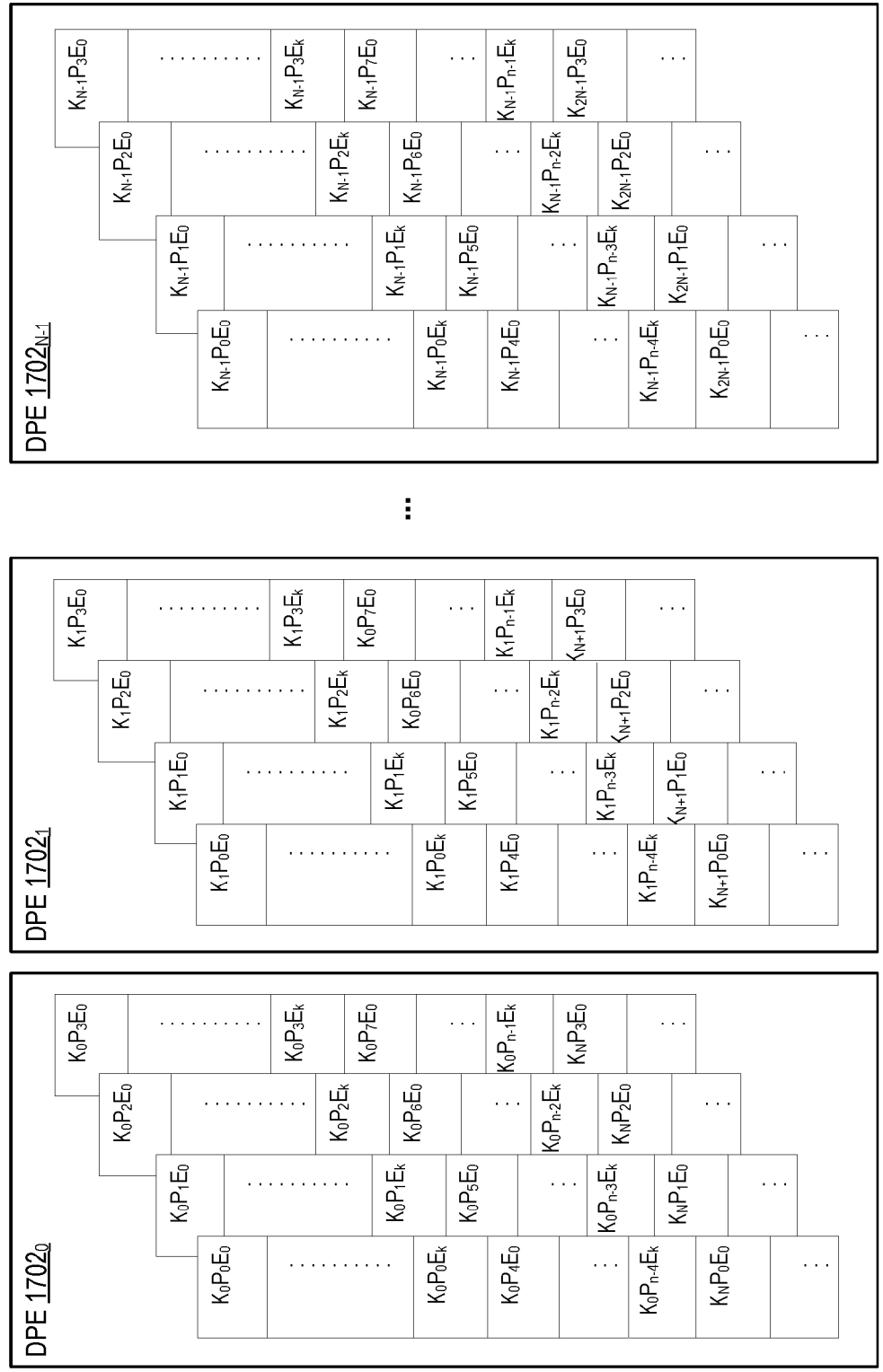
FIG. 17 illustrates the data organization in buffers, in accordance with the embodiments disclosed.

FIG. 16 illustrates the data organization in buffers, in accordance with the embodiments disclosed. Specifically, FIG. 17 illustrates the data organization of feeding buffers, such as the feeding buffers $714_1$ and $714_2$ of FIG. 7, of a reconfigurable IC, such as the reconfigurable IC 120 of FIG. 1. In the exemplary embodiment, the reconfigurable IC re-organizes the data from the iStage buffers when passed through a feeding controller, such as the feeding controller 710 of FIG. 7, writes the reorganized data into feeding buffers, which feed the DPE array, such as the DPE array 730 of FIG. 7, with the input data (e.g., IFMs). The feeding controller of the reconfigurable IC again organizes the data of the feeding buffers as banks with each bank comprising four sub-banks. The reconfigurable IC can configure the number of based on the number of parallel NNUs configured. In one embodiment, each sub-bank comprises dual-ported BRAM and hosts data (e.g., input data) for two output elements in an OFM. Accordingly, for an nth NNU configuration, the feeding buffers have n/2 banks. The reconfigurable IC organizes data in the feeding buffers in a contiguous fashion for each output element of OFMs.

In the exemplary data organization 1600, "$P_n$" represents the nth-plane (IFM), "E" represents an element within a plane, "W" represents the width of an IFM, and "NP" represents the number of NNUs configured for each DPE of the reconfigurable IC.

In one exemplary embodiment, the reconfigurable IC has configured banks $1602_1$-$1602_N$ to have dual-ported sub-banks. Bank $1602_1$ feeds the zero-th NNU and the NP/2-th NNU. Bank $1602_2$ feeds the first NNU and the NP/2+1-th NNU. This pattern continues until at the end, Bank $1602_{P-1}$ feeds a NP/2-1-th NNU and the NP-1-th NNU.

FIG. 17 illustrates the data organization in buffers, in accordance with the embodiments disclosed. Specifically, FIG. 17 illustrates the data organization of the weight buffers, such as the weight ping buffer $716_1$ and weight pong buffer $716_2$ of FIG. 7. In the exemplary embodiment, the reconfigurable IC organizes the weight buffers as banks, and each bank comprises four sub-banks. Each DPE $1702_0$-$1702_{N-1}$ comprises weight buffers organized as banks, and further into sub-banks. Each bank feeds the NNUs within a DPE. In the exemplary data organization 1700, $P_n$ represents the n-th IFM, $E_n$ represents the n-th element within a MxM filter for an IFM, and Ki represents the i-th DPE or the i-th OFM.

FIG. 18 depicts example arrangements of neural network units, in accordance with the embodiments disclosed. In some embodiments, with some reorganization, the reconfigurable IC can process a batch of input images in parallel. FIG. 18 illustrates the organization of NNUs within DPEs (DPE $1832_1$, DPE $1832_2$, and DPE $1832_3$) to achieve various batch-sizes. In the exemplary embodiment, the batch-size determines how much on-chip memory is needed to hold the data for each image of the batch. For example, because DPE $1832_2$ uses a batch size of 2, half of the BRAMs in the iStage buffers hold the data for the first image (Image 0) and the rest of the BRAMs hold the second image (Image 1). Thus, half of the NNUs in DPE $1832_2$ generate output data points of the first image (Image 0) and the rest generate output data points of the second image (Image 1). Accordingly, the reconfigurable IC organizes the oStage buffer similar to the iStage buffer. Similarly, because DPE $1832_3$ uses a batch size of 4, a quarter of the BRAMs in the iStage buffers holds the data for the first image (Image 0), a quarter of the BRAMs in the iStage buffers holds the data for the second image (Image 1), a quarter of the BRAMs in the iStage buffers holds the data for the third image (Image 2), and the rest of the BRAMs hold the fourth image (Image 1). Thus, a quarter of the NNUs in DPE $1832_3$ generates output data points of the first image (Image 0), a quarter of the NNUs in DPE $1832_3$ generates output data points of the second image (Image 1), a quarter of the NNUs in DPE $1832_3$ generates output data points of the third image (Image 2), and the rest generate output data points of the fourth image (Image 3).

This configuration shown with DPE $1832_2$ and DPE $1832_3$ can extend to a batch size of 8 as the iStage buffers and the oStage buffers are organized as eight banks.

FIG. 19 illustrates data flow of buffers of the neural network reconfigurable IC, in accordance with the embodiments disclosed. Specifically, FIG. 19 illustrates the data flow of different instances of buffers when the reconfigurable IC processes a patch of input images in parallel. In some embodiments, because of the ping-pong-buffering organization of the iStage buffers and the oStage buffers, the reconfigurable IC can achieve batch sizes larger than eight. For example, the reconfigurable IC can use the iStage ping buffer to process a batch of eight images (0-7), and the iStage pong buffer to process the next batch of eight images (8-15). Then, the reconfigurable IC bounces back to the iStage ping buffer to process the next set of eight images (16-23), then to the pong buffer for the next set of eight images, and so on.

The exemplary data flow 1900 illustrates that RI state, the PS state, and the WO state for a few exemplary images, such as Image 0 ("*_0"), Image 1 ("*_1"), and Image 2 ("*_2").

Figure 20:
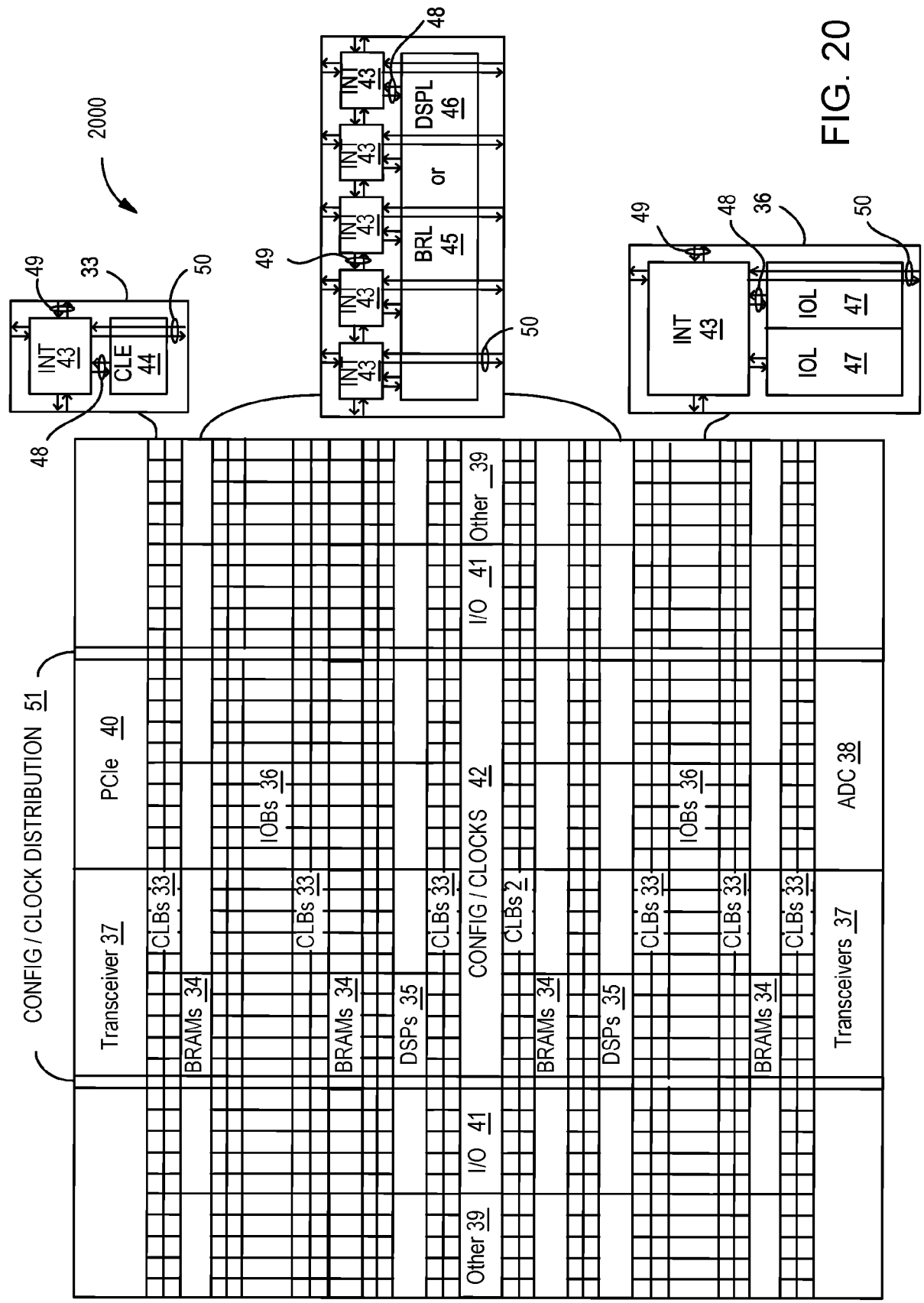
FIG. 20 illustrates a field programmable gate array implementation of a programmable IC according to an example To facilitate understanding, identical reference numerals have been used, where possible, to designate identical elements that are common to the figures. It is contemplated that elements of one example may be beneficially incorporated in other examples.

FIG. 20 illustrates an FPGA 2000 implementation of the IC 100 that includes a large number of different programmable tiles including transceivers 37, CLBs 33, BRAMs 34, input/output blocks ("IOBs") 36, configuration and clocking logic ("CONFIG/CLOCKS") 42, DSP blocks 35, specialized input/output blocks ("IO") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 20. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. In one embodiment, the BRAM 34 is a part of memory 140 which can retain stored data during reconfigurations as described above. Typically, the number of interconnect elements included in a tile depends on the height of the tile. In the pictured example, a BRAM tile has the same height as five CLBs, but other numbers (e.g., four) can also be used. A DSP block 35 can include a DSP logic element ("DSPL") 46 in addition to an appropriate number of programmable interconnect elements. An IOB 36 can include, for example, two instances of an input/output logic element ("IOL") 47 in addition to one instance of the programmable interconnect element 43. As will be clear to those of skill in the art, the actual IO pads connected, for example, to the IO logic element 47 typically are not confined to the area of the input/output logic element 47.

In the pictured example, a horizontal area near the center of the die (shown in FIG. 20) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 20 include additional logic blocks that disrupt the regular columnar structure making up a large part of the FPGA. The additional logic blocks can be programmable blocks and/or dedicated logic.

Note that FIG. 20 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 20 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit (IC), comprising:
a digital processing engine (DPE) array having a plurality of DPEs configured to execute one or more layers of a neural network;
reconfigurable integrated circuitry configured to include:
an input/output (IO) controller configured to receive input data to be processed by the DPE array based on the one or more layers of the neural network;
a feeding controller configured to feed the input data from the IO controller to the DPE array executing the one or more layers of the neural network;
a weight controller configured to provide weight parameters used for processing the input data through the one or more layers of the neural network to the DPE array;
an output controller configured to receive processed data from the DPE array based on the one or more layers of the neural network; and
configurable buffers configured to communicate with the IO controller, the feeding controller, the weight controller, and the output controller to facilitate data processing between the IO controller, the feeding controller and the weight controller by alternating between storing and processing data in the configurable buffers;
wherein a first one of the DPEs comprises a neural network unit (NNU) configured to process the input data; and
wherein the NNU comprises digital signal processors (DSPs) configured to process the input data at a frequency that is at least double a frequency at which the programmable logic is configured to operate.

2. The IC of claim 1, wherein the DPE array comprises a subset of operating DPEs to process the input data for a layer of a neural network model, wherein each of the subset of operating DPEs is independently configurable.

3. The IC of claim 2, wherein the configurable buffers comprises multiple instances of weight buffers managed by the weight controller, and a number of the multiple instances of the weight buffers corresponds to a number of operating DPEs, wherein each instance of weight buffers comprises weight data for a corresponding operating DPE.

4. The IC of claim 2, wherein the DPE array further comprises output buffers corresponding to a number of the subset of operating DPEs, each output buffer comprising processed data generated from the subset of operating DPEs.

5. The IC of claim 1, wherein the first DPE comprises multiple independently configurable NNUs.

6. The IC of claim 1, wherein the configurable buffers are configured to provide data to the NNU by alternating between a first configurable buffer and a second configurable buffer for data processing by the NNU.

7. The IC of claim 1, wherein the configurable buffers are configured to send data for at least two multiply-accumulate operations in a single clock cycle.

8. The IC of claim 1, wherein the configurable buffers comprise a first IO buffer and a second IO buffer, wherein at a first stage, the IO controller stores the input data into the first IO buffer while the feeding controller processes the input data in the second IO buffer and at a second stage, the IO controller stores the input data into the second IO buffer while the feeding controller processes the input data in the first IO buffer.

9. The IC of claim 1, wherein the configurable buffers comprise a first feeding buffer and a second feeding buffer, wherein at a first stage, the feeding controller stores the input data into the first feeding buffer and the DPE array processes the input data in the second feeding buffer and at a second stage, the feeding controller stores the input data into the second feeding buffer while the DPE array processes the input data in the first feeding buffer.

10. The IC of claim 1, wherein the configurable buffers comprise a first weight buffer and a second weight buffer, wherein at a first stage, the weight controller stores weight data into the first weight buffer and the DPE array processes the weight data in the second weight buffer, and at a second stage, the weight controller stores the input data into the second weight buffer while the DPE array processes the input data in the first weight buffer.

11. The IC of claim 1, wherein the configurable buffers comprise a first output buffer and a second output buffer, wherein at a first stage, the output controller stores the processed data into the first output buffer while the IO controller writes the processed data in the second output buffer to external memory, and at a second stage, the output controller stores the processed data into the second output buffer while the IO controller writes the processed data in the first output buffer to the external memory.

12. The IC of claim 1, wherein:
the first DPE comprises multiple NNUs; and
the IC is configured by a host to identify first and second subsets of the NNUs to process respective first and second input data sets of the input data, and wherein the first input data set and the second data set are different from each other.

13. A method for operating an integrated circuit (IC), the method comprising:
storing input data into a first input buffer of input ping-pong buffers while data stored in a second input buffer of the input ping-pong is processed;
transmitting the input data through feeding ping-pong buffers to a digital processing engine (DPE) array by storing the input data into a first feeding buffer of the feeding ping-pong buffers while a data stored in a second feeding buffer of the feeding ping-pong buffers is processed by one or more layers executing in the DPE array to generate output data;
storing weight data in a first weight buffer of weight ping-pong buffers while data stored in a second weight buffer of the weight ping-pong buffers is processed by the one or more layers executing in the DPE array; and storing the output data in a first output buffer of output ping-pong buffers while data stored in a second output buffer of the output ping-pong buffers is outputted to a host computing system communicatively coupled to the IC;

wherein a first one of the DPEs comprises a neural network unit (NNUs) configured to process the input data; and wherein the NNU comprises digital signal processors (DSPs) configured to process the input data at a frequency that is double a frequency at which the programmable logic is configured to operate.

14. The method of claim 13, wherein during a ProcessStage (PS) state, the DPE array processes the input data to generate the output data and populates a buffer of the output ping-pong buffers with the output data.

15. The method of claim 14, wherein during the PS state, a ReadInput (RI) state begins for one of the input ping-pong buffers, and during RI state, an input/output (IO) controller receives the input data from the interconnect and stores the input data into the one of the input ping-pong buffers.

16. The method of claim 14, wherein during the PS state, a WriteOutput (WO) state begins for another buffer of the output ping-pong buffers, and during the WO state, the output controller outputs the output data in the another buffer of the output ping-pong buffers to the host computing system.

17. The method of claim 14, wherein during the PS state, a LoadFeedingBuffer (LF) state begins for one of the feeding ping-pong buffers, and during the LF state, a feeding controller stores the input data from an IO controller into the one of the feeding ping-pong buffers.

18. The method of claim 14, wherein during the PS state, a ProcessFeedingBuff (PF) state begins for one of the feeding ping-pong buffers, and during the PF state, the DPE array reads the input data in the one of the feeding ping-pong buffers.

19. The method of claim 18, wherein during the PF state, a ReadWeights (RW) state begins for one of the weight ping-pong buffers, and during the RW state, a the weight controller stores the weight data into one of the weight ping-pong buffers; and a Compute-and-Store (CS) state begins for one of the weight ping-pong buffers, and during the CS state, the DPE array reads the weight data in the one of the weight ping-pong buffers.

20. An integrated circuit (IC), comprising:
a digital processing engine (DPE) array having a plurality of DPEs configured to execute one or more layers of a neural network;
programmable logic comprising:
   an input/output (IO) controller configured to receive input data to be processed by the DPE array based on the one or more layers of the neural network;
   a feeding controller configured to feed the input data from the IO controller to the DPE array executing the one or more layers of the neural network;
   a weight controller configured to provide weight parameters used for processing the input data through the one or more layers of the neural network to the DPE array;
   an output controller configured to receive processed data from the DPE array based on the one or more layers of the neural network; and
   configurable buffers configured to communicate with the IO controller, the feeding controller, the weight controller, and the output controller to facilitate data processing between the IO controller, the feeding controller and the weight controller by alternating between storing and processing data in the configurable buffers;
wherein the configurable buffers are configured to send data for at least two multiply-accumulate operations in a single clock cycle.

21. An integrated circuit (IC), comprising:
a digital processing engine (DPE) array having a plurality of DPEs configured to execute one or more layers of a neural network;
a plurality of controllers that include,
   an input/output (IO) controller configured to receive input data to be processed by the DPE array based on the one or more layers of the neural network,
   a feeding controller configured to feed the input data from the IO controller to the DPE array executing the one or more layers of the neural network,
   a weight controller configured to provide weight parameters used for processing the input data through the one or more layers of the neural network to the DPE array, and
   an output controller configured to receive processed data from the DPE array based on the one or more layers of the neural network; and
first and second buffers coupled to an output of a first one of the controllers, wherein the first one of the controllers is configured to write data to the first buffer while data is read out of the second buffer, and to write data to the second buffer while data is read out of the first buffer.

* * * * *